United States Patent
Vadlamani et al.

(10) Patent No.: US 12,273,305 B2
(45) Date of Patent: Apr. 8, 2025

(54) SYSTEM AND METHOD OF MANAGING CHANNEL AGNOSTIC MESSAGES IN A MULTI-CLIENT CUSTOMER PLATFORM

(71) Applicant: HUBSPOT, INC., Cambridge, MA (US)

(72) Inventors: Vijay Vadlamani, Cambridge, MA (US); Antoinette Hocbo, Cambridge, MA (US); Harminder Singh, Reading, MA (US); Nathaniel Dempkowski, Cambridge, MA (US)

(73) Assignee: HubSpot, Inc., Cambridge, MA (US)

( * ) Notice: Subject to any disclaimer, the term of this patent is extended or adjusted under 35 U.S.C. 154(b) by 0 days.

(21) Appl. No.: 18/244,665

(22) Filed: Sep. 11, 2023

(65) Prior Publication Data

US 2024/0089224 A1 Mar. 14, 2024

Related U.S. Application Data

(60) Provisional application No. 63/405,103, filed on Sep. 9, 2022.

(51) Int. Cl.
*H04L 51/046* (2022.01)
*H04L 51/02* (2022.01)
*H04L 51/21* (2022.01)

(52) U.S. Cl.
CPC .......... *H04L 51/046* (2013.01); *H04L 51/02* (2013.01); *H04L 51/21* (2022.05)

(58) Field of Classification Search
CPC ........ H04L 51/046; H04L 51/21; H04L 51/02
See application file for complete search history.

(56) References Cited

U.S. PATENT DOCUMENTS

| | | | |
|---|---|---|---|
| 7,136,941 B2 | 11/2006 | Nguyen et al. |
| 7,580,982 B2 | 8/2009 | Owen et al. |
| 7,584,114 B2 | 9/2009 | Estrada et al. |
| 7,792,835 B2 | 9/2010 | Bohannon et al. |
| 7,831,676 B1 | 11/2010 | Nagar |
| 7,984,297 B2 | 7/2011 | Bohannon et al. |
| 7,992,145 B2 | 8/2011 | Emerson et al. |
| 8,006,261 B1 | 8/2011 | Haberman et al. |
| 8,224,902 B1 | 7/2012 | Glasser et al. |
| 8,442,969 B2 | 5/2013 | Gross |
| 8,594,618 B2 | 11/2013 | Meyer et al. |
| 8,706,800 B1 | 4/2014 | Ahmed et al. |
| 8,719,356 B2 | 5/2014 | Dillingham et al. |
| 9,304,862 B2 | 4/2016 | Simon et al. |
| 9,305,104 B2 | 4/2016 | Wu et al. |

(Continued)

*Primary Examiner* — Ario Etienne
*Assistant Examiner* — Kidest Mendaye
(74) *Attorney, Agent, or Firm* — Cooper Legal Group, LLC

(57) ABSTRACT

Techniques are provided for implementing omnichannel messaging. A set of application programming interfaces are utilized to create a set of channels connected to services of a customer platform. A channel is defined to specify how the channel is to interact with a service of the customer platform. Flows are formatted and defined for sending and receiving messages across the set of channels based upon native messaging experiences provided by the services of the customer platform. Flows are formatted and defined for viewing and interacting with the messages based upon a set of contexts for viewing and interacting with the messages through the services. The flows are executed for processing messages.

19 Claims, 18 Drawing Sheets

(56) References Cited

U.S. PATENT DOCUMENTS

| | | |
|---|---|---|
| 9,317,816 B2 | 4/2016 | Zeng et al. |
| 9,356,947 B2 | 5/2016 | Shraim et al. |
| 10,115,060 B2 | 10/2018 | Chestnut et al. |
| 10,217,058 B2 | 2/2019 | Gamon et al. |
| 10,387,559 B1 | 8/2019 | Wendt et al. |
| 10,853,082 B1 | 12/2020 | Aleti et al. |
| 10,992,780 B1 | 4/2021 | Rudrappa Goniwada et al. |
| 2002/0099697 A1 | 7/2002 | Jensen-Grey |
| 2002/0152254 A1 | 10/2002 | Teng |
| 2002/0199194 A1 | 12/2002 | Ali |
| 2003/0097617 A1 | 5/2003 | Goeller et al. |
| 2003/0208472 A1 | 11/2003 | Pham |
| 2004/0034652 A1 | 2/2004 | Hofmann |
| 2004/0111327 A1 | 6/2004 | Kidd |
| 2004/0122803 A1 | 6/2004 | Dom et al. |
| 2004/0260621 A1 | 12/2004 | Foster |
| 2005/0160166 A1 | 7/2005 | Kraenzel |
| 2005/0188028 A1 | 8/2005 | Brown, Jr. et al. |
| 2005/0210111 A1 | 9/2005 | Fukudome |
| 2005/0265319 A1 | 12/2005 | Clegg et al. |
| 2006/0059253 A1* | 3/2006 | Goodman ............... G06Q 10/10 709/223 |
| 2006/0095556 A1 | 5/2006 | Arnold et al. |
| 2006/0212931 A1 | 9/2006 | Shull et al. |
| 2006/0224673 A1 | 10/2006 | Stern et al. |
| 2006/0242140 A1 | 10/2006 | Wnek |
| 2007/0011073 A1 | 1/2007 | Gardner et al. |
| 2007/0136430 A1 | 6/2007 | Qureshi et al. |
| 2007/0203996 A1 | 8/2007 | Davitz et al. |
| 2007/0299777 A1 | 12/2007 | Shraim et al. |
| 2008/0034432 A1 | 2/2008 | Bohannon et al. |
| 2008/0168269 A1 | 7/2008 | Wilson |
| 2008/0172606 A1 | 7/2008 | White |
| 2009/0013041 A1 | 1/2009 | Farmer et al. |
| 2009/0019003 A1 | 1/2009 | Bohannon et al. |
| 2009/0119268 A1 | 5/2009 | Bandaru et al. |
| 2009/0138711 A1 | 5/2009 | Heimbigner |
| 2009/0248813 A1 | 10/2009 | Sawhney |
| 2010/0100778 A1* | 4/2010 | Sullivan ............... H04L 43/0817 709/224 |
| 2010/0161506 A1 | 6/2010 | Bosenick et al. |
| 2010/0161735 A1 | 6/2010 | Sharma |
| 2010/0186088 A1 | 7/2010 | Banerjee et al. |
| 2010/0228777 A1 | 9/2010 | Imig et al. |
| 2010/0235915 A1 | 9/2010 | Memon et al. |
| 2010/0312837 A1 | 12/2010 | Bodapati et al. |
| 2011/0029504 A1 | 2/2011 | King et al. |
| 2011/0149725 A1 | 6/2011 | Zhao et al. |
| 2011/0179067 A1 | 7/2011 | Dalvi et al. |
| 2011/0258218 A1 | 10/2011 | Hayes et al. |
| 2012/0053887 A1 | 3/2012 | Nurmi |
| 2012/0191546 A1 | 7/2012 | Phelan et al. |
| 2012/0197862 A1 | 8/2012 | Woytowitz et al. |
| 2012/0198056 A1 | 8/2012 | Shama et al. |
| 2012/0316904 A1 | 12/2012 | Eder |
| 2013/0007627 A1 | 1/2013 | Monaco |
| 2013/0047034 A1 | 2/2013 | Salomon et al. |
| 2013/0054622 A1 | 2/2013 | Karmarkar et al. |
| 2013/0073336 A1 | 3/2013 | Heath |
| 2013/0138555 A1 | 5/2013 | Shishkov |
| 2013/0238715 A1 | 9/2013 | Sanyal et al. |
| 2013/0339456 A1 | 12/2013 | Nikolayev et al. |
| 2014/0006139 A1 | 1/2014 | Aggarwal et al. |
| 2014/0025683 A1 | 1/2014 | Howland et al. |
| 2014/0025763 A1 | 1/2014 | Furlong et al. |
| 2014/0105508 A1 | 4/2014 | Arora |
| 2014/0108309 A1 | 4/2014 | Frank et al. |
| 2014/0156681 A1 | 6/2014 | Lee et al. |
| 2014/0214974 A1 | 7/2014 | Kurzanski et al. |
| 2014/0236663 A1 | 8/2014 | Smith |
| 2014/0258169 A1 | 9/2014 | Wong et al. |
| 2014/0279622 A1 | 9/2014 | Bharadwaj et al. |
| 2014/0280453 A1 | 9/2014 | Mattison et al. |
| 2014/0328172 A1 | 11/2014 | Kumar et al. |
| 2014/0372363 A1 | 12/2014 | Chestnut et al. |
| 2014/0372566 A1 | 12/2014 | Milne et al. |
| 2015/0006647 A1 | 1/2015 | Steinberg et al. |
| 2015/0032826 A1 | 1/2015 | Gunaratnam |
| 2015/0032827 A1 | 1/2015 | Tyler et al. |
| 2015/0081611 A1 | 3/2015 | Shivakumar |
| 2015/0100896 A1 | 4/2015 | Shmarovoz et al. |
| 2015/0154664 A1 | 6/2015 | Dawson et al. |
| 2015/0188874 A1 | 7/2015 | Feinstein |
| 2015/0248490 A1 | 9/2015 | Myslinski |
| 2015/0286357 A1 | 10/2015 | Penha et al. |
| 2015/0310446 A1* | 10/2015 | Tuchman ............... H04L 67/561 705/304 |
| 2015/0312187 A1 | 10/2015 | Menna et al. |
| 2015/0324469 A1 | 11/2015 | Keyngnaert et al. |
| 2015/0347924 A1 | 12/2015 | Zeng et al. |
| 2015/0379018 A1 | 12/2015 | Gur et al. |
| 2015/0381552 A1 | 12/2015 | Vijay et al. |
| 2016/0012364 A1 | 1/2016 | Filgueiras |
| 2016/0020917 A1 | 1/2016 | Tuatini et al. |
| 2016/0026720 A1* | 1/2016 | Lehrer ............... G06F 16/23 707/710 |
| 2016/0036750 A1 | 2/2016 | Yuan |
| 2016/0063560 A1 | 3/2016 | Hameed et al. |
| 2016/0078455 A1* | 3/2016 | O'Donnell ........... G06Q 10/107 705/7.29 |
| 2016/0119260 A1 | 4/2016 | Ghafourifar et al. |
| 2016/0156858 A1 | 6/2016 | Lee et al. |
| 2016/0180248 A1 | 6/2016 | Regan |
| 2016/0226808 A1 | 8/2016 | Lin |
| 2016/0232540 A1 | 8/2016 | Gao et al. |
| 2016/0307191 A1 | 10/2016 | Turgeman et al. |
| 2016/0315969 A1 | 10/2016 | Goldstein |
| 2016/0359793 A1 | 12/2016 | Kraios et al. |
| 2017/0005954 A1 | 1/2017 | Shaltiel et al. |
| 2017/0031894 A1 | 2/2017 | Bettersworth et al. |
| 2017/0068982 A1 | 3/2017 | Vangala et al. |
| 2017/0103439 A1 | 4/2017 | Kolb et al. |
| 2017/0103441 A1 | 4/2017 | Kolb et al. |
| 2017/0186042 A1 | 6/2017 | Wong et al. |
| 2017/0221089 A1 | 8/2017 | Zhu et al. |
| 2017/0264577 A1 | 9/2017 | Ganin et al. |
| 2017/0289287 A1 | 10/2017 | Modi et al. |
| 2017/0317962 A1 | 11/2017 | Chen |
| 2017/0337569 A1 | 11/2017 | Sasson |
| 2017/0353410 A1 | 12/2017 | Gonzales |
| 2018/0039696 A1 | 2/2018 | Zhai et al. |
| 2018/0097759 A1 | 4/2018 | Brechbuhl et al. |
| 2018/0097828 A1 | 4/2018 | Coskun |
| 2018/0121986 A1 | 5/2018 | Akkiraju et al. |
| 2018/0336495 A1 | 11/2018 | Chestnut et al. |
| 2020/0067861 A1 | 2/2020 | Leddy |
| 2020/0106630 A1* | 4/2020 | Bourassa ............ H04L 12/1818 |
| 2021/0342785 A1* | 11/2021 | Mann ............... G06F 40/186 |
| 2023/0246860 A1* | 8/2023 | Hahn ............... H04L 51/224 709/204 |

* cited by examiner

SYSTEM AND METHOD OF MANAGING CHANNEL AGNOSTIC MESSAGES IN A MULTI-CLIENT CUSTOMER PLATFORM

RELATED APPLICATIONS

This application claims priority to U.S. Provisional Patent Application, titled "OMNICHANNEL MESSAGING", filed on Sep. 9, 2022 and accorded Application No.: 63/405,103, which is incorporated herein by reference.

BACKGROUND

Many businesses provide customers with communication capabilities through websites, applications, text messaging, email, etc. A customer can utilize these communication capabilities to inquire about a product or service, obtain support to troubleshoot a product or service, provide feedback, etc. For example, a user may own a refrigerator that includes a water dispenser. The water dispenser uses a filter that is to be replaced every year. The user may access a website of the manufacturer of the refrigerator in order to inquire as to which filter model to purchase. The user may engage with a chat bot, interact with a frequently asked questions page, submit a question through a form of the website, request a phone call from an agent, engage in a message conversation with an agent, etc. In this way, the user can utilize the communication capabilities provided by website in order to obtain the filter model.

DETAILED DESCRIPTION

Figure 1:
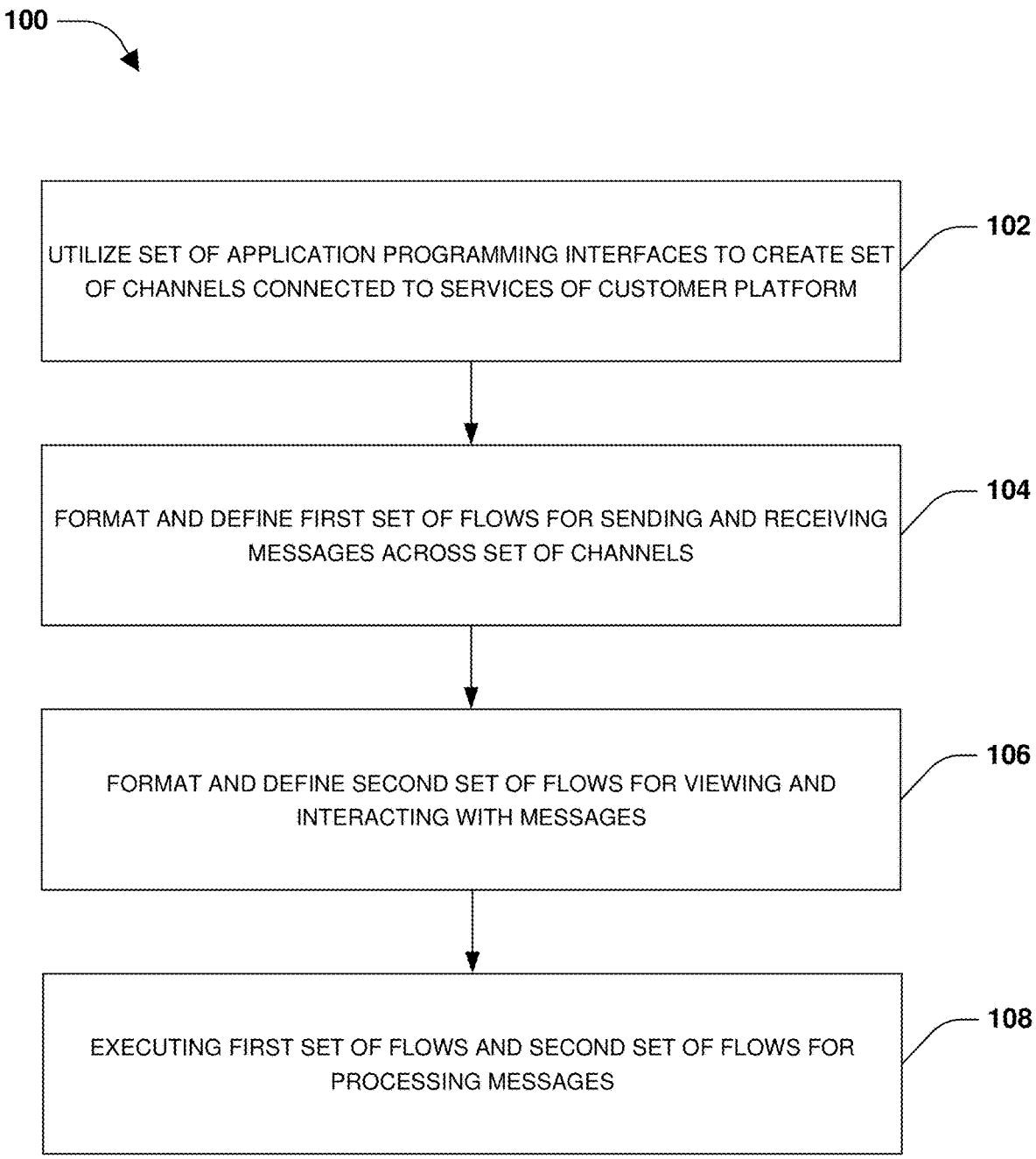
FIG. 1 is a flow chart illustrating an example method for providing omnichannel messaging.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

Systems and methods for omnichannel messaging are provided. A communication platform hosts a channel framework where a channel can be connected and configured to services of a customer platform. A channel may correspond to a particular communication medium through which communication can occur, such as text message, email, social network messages, direct messages, chat messages, forum or blog messages, messages exchanged through a website, messages exchanged through an application, etc. The services of the customer platform may include a team workspace service (e.g., a service where a user such as an agent can view messages received/sent over the channel), a customer service relationship management (CRM) service (e.g., a service that stores customer data and message data within objects), a workflow service (e.g., messages sent/received over a channel may trigger a particular workflow), a reporting service (e.g., a report may be generated based upon message data), a team workspace service (e.g., an interface used by agents to perform customer service related tasks such as processing tickets or communicating with customers over the channel), a customer portal, etc. This enables the creation of new channels at scale via a common set of application programming interfaces. This also provides the ability to connect any channel and configure the channel to work seamlessly with a messaging service and tools of a customer platform (e.g., a multi-service business platform, a service platform, etc.). The channel framework provides the ability to send and receive messages through a consistent format, and provides flows that enable messages to be sent and received across available channels. The channel framework supports a wide range of messaging capabilities that closely align with a native messaging experience between users of the customer platform (e.g., between customers and agents). The channel framework provides message viewing and actioning functionality. In particular, the channel framework provides a consistent format and flows for viewing and interacting with messages in various contexts such as a team workspace context of the team workspace service, a CRM, a customer portal, and/or other user interfaces and services provided by websites, applications, etc. That is, the context may relate to the type of interaction and/or interface that will be used to view and interact with messages sent/received over the channel.

As part of connecting and configuring a channel, a data framework is provided to identify a channel and define capabilities of what the channel can and cannot do (a channel configuration), which enables the ability to determine how a channel is allowed to interact with a messaging service (e.g., a team workspace) and/or tools of the customer platform (services, systems, and/or applications of the multi-service business platform). An integrator is provided with the ability to define and set a channel configuration of these capabilities using channel integration APIs. In some embodiments, a channel may correspond to an email service, a website chat, a social network messenger app, a messaging/chat app, a website forum, a website calling service, etc. A user experience framework is provided for discovering and connecting any channel in a team workspace, which provides administrators with a consistent and easy way to find and add any number of channels such as from the team workspace and/or an app marketplace. The data framework captures and stores specific user accounts for a given channel. The user accounts store information about the account and account specific functionality. An administrator may select specific user accounts to connect for syncing and sending messages in a team workspace during channel connection. The user experience framework provides the ability to configure any channel in the team workspace (e.g., a particular email account, a social network messenger account, chat account with a chat app, and/or other channels may be connected to the team workspace). This allows administrators to seamlessly and consistently integrate any channel into workflows through notifications (e.g., a customer service workflow for customer service related messages, a sales workflow for sales related messages, etc.), routing automation (e.g., routing a message to a particular service, application, or person), and ticket automation (e.g., updating a service ticket based upon information within a message received over a channel such as where a customer provides an updated status of a troubleshooting step performed by the customer).

As part of connecting and configuring a channel for sending and receiving messages, channel integration APIs are provided. The data framework helps connect internal and external developers for creating and configuring channels and channel accounts. The channel integration APIs also provide services for sending and receiving messages through the team workspace. This allows developers to easily create new channels without having to understand the nuances of the team workspace and tools (systems) of the customer platform.

As part of sending and receiving messages, a message composer is provided. The message composer includes a data and user experience for handling a wide range of composing capabilities such as text formatting, rich media, attachment handling, recipient searching, and channel switching (e.g., switching from a channel associated with a particular email account to a channel associated with a social network messaging app account). Message viewing and actioning is provided, which includes a common message format. A data and user experience framework is provided to utilize the common message format for sending, receiving, and displaying message content and metadata according to a particular context, and for interacting with messages in a consistent and extensible manner regardless of which channel the messages are associated. Context switching can be performed on-demand such as when a user switches from viewing message in one context (e.g., a team workspace such as a workspace where customer service agents can work on customer service tickets) context for viewing messages, processing tickets, and communicating with customers) to another context (e.g., a CRM context of viewing message data within objects). Message threading is provided through a framework for defining how messages can trigger the creation of new conversations and/or are threaded into open/existing conversations.

Team workspaces are provided with channel integration. The team workspaces can include a thread list. The thread list utilizes a common message format to populate fields such as recipient, timestamp, and message content. The team workspace team includes team workspace views and filters. A channel configuration defines channel properties of a team workspace search and is used for creating views (e.g., viewing results of a team workspace search for a chat with a bot, emails, messenger messages, forms, etc. of a particular channel such as a call channel, an email channel, a live chat channel, a chat app channel). The search provides filtering by date, channel, status, whether a message is assigned or unassigned, etc. A view may be created where filters can be applied for determining what tickets will be seen, such as a source channel.

Team workspace settings may include channel settings. The channel settings include channel accounts and a channel settings framework that defines what channels appear in settings and what properties are configurable by administrators. A send form may include a from name input element, a from address input element, a forwarding address input element, a team signature input element, etc. Team workspace settings may include routing and ticket automation. The routing and ticket automation includes channel accounts and a channel settings framework that provides administrators with the ability to configure automation based on channel (e.g., automatically assign conversations to a specific user(s) and/or team(s), whether incoming conversations are to be treated as support tickets, etc.). The routing and ticket automation includes notifications where the channel settings framework provides administrators with the ability to configure notifications based upon a channel (e.g., get notification when a new live chat, bot, or messenger conversation is assigned to a user; get notification when chat or messenger conversation is assigned to user and bots where a notification is provided only at the point of handoff; get notification when an email conversation is assigned to a user; etc.).

Omnichannel messaging may be integrated with a customer relationship management (CRM) system. Contact creation is provided where a channel settings framework provides administrators with the ability to define when contacts are created from incoming messages. Compose from CRM functionality includes a message composer that enables users (e.g., reps) to compose messages on any channel (e.g., within the capability for business-initiated sends) from the CRM system. Delivery ID storage includes channel configuration and a common message format that captures recipient information and stores the recipient information in a contact. Embedded threads include channel capabilities, the common message format, and message threading that provides information on how threads are displayed in the CRM and other contexts.

Reporting and automation is provided, which includes a conversation object with reporting and workflows. Channel properties (e.g., channel name, channel accounts, etc.) on the conversation objects are derived from a channel configuration and channel accounts, and enable channel-related reporting and automation. A report can be generated with information populated within a conversation object (e.g., information extracted from messages). A workflow may be triggered based upon information populated within a conversation object.

Omnichannel messaging may be represented by a channels system map where third party channel providers (e.g., developers) utilize APIs to configure a channel to work with the team workspace. The third party channel providers may utilize channel integration APIs to create channel configurations for the channels (e.g., an email channel of an email provider service, a social network channel of a social network service, etc.). The channel configurations include a message composer (e.g., team workspace and CRM) and a common message format. The channels (third party channels) are published to an app marketplace.

An administrator discovers and installs a channel (third party channel) from the app marketplace through a channel connection. The administrator selects accounts to connect (channel accounts) and the accounts are further configured in team workspace settings (channel settings), such as configuration of notifications, contact creation, message threading, conversation threading, etc. A conversation thread syncs data to a conversation object (which powers reports, workflows, and team workspace components) and powers routing automation and ticket automation. The administrator can set automation and notifications, and threading and contact creation based on channel properties. The conversation object inherits channel accounts and properties via the conversation thread. Reporting, workflows, and team workspace components are powered by the conversation object. In this way, the conversation object is linked to reporting, workflows, thread list, views, and filters, and viewing threads in the CRM.

An omnichannel messaging stack includes the ability to integrate messaging with other internal tools and systems where teams/ecosystem can easily build new messaging experiences (e.g. a platform team related to CRM, automation, data, etc.). An extensibility layer of the omnichannel messaging stack provides APIs such as channels, object properties, create, read, update, and delete (CRUD) operations, and UI extensions to threads, a reply editor, the team workspace, and a widget. An integration layer of the omnichannel messaging stack provides a representation in CRM and system integrations such as automation, notifications, subscriptions, conversation intelligence (CI), CRM, etc. Generic messaging capabilities of the omnichannel messaging stack include a generic channel framework, omnichannel capabilities, threading, etc. A messaging infrastructure of the omnichannel messaging stack includes message publishing, security, privacy, performance, etc. A data layer of the omnichannel messaging stack includes a conversation CRM object.

Omnichannel messaging improves messaging services and computing platforms by 1) extending a computing platform (a messaging platform) to deliver powerful and unique experiences; 2) enabling the ability to seamlessly move channels without losing context (e.g., switching from viewing emails to viewing user submitted forms communication through a team workspace context (e.g., a workspace where customer service agents can work on customer service tickets and communicate with customers); 3) leveraging a CRM platform to power conversational automation, reporting, and other unique experiences driven through information populated within objects of the CRM platform using message data of messages; 4) allowing any user to use messaging at work, including integration with relevant outreach tools; and 5) making it more efficient and easy to communicate over any messaging channel, and storage all the messaging interactions in the CRM platform. This innovation provides a flexible and channel agnostic messaging infrastructure, supports a wide range of messaging channels, provides a faster time to market when adding support for new channels, provides a uniform and coherent experience across teams and customers, and provides robust functionality with full omnichannel support.

The techniques described herein provide omnichannel messaging that provides business with the ability to seamlessly communicate with customers. Omnichannel messaging provides a coherent user experience, unified data, and seamless collaboration with 1:1 conversations at scale to turn 1-way broadcast messages into 2-way engaging conversations, provides sales teams with messaging capabilities throughout a sales journey from prospecting to follow-up, and empowers support teams with historical context and customers with self-serving tools on any channel. Omnichannel messaging may be leveraged by production teams (e.g., a single developer or group of developers such as an internal feature team, a third party app integrator, customer in-house developers, etc.) to build powerful and connected communications. Omnichannel messaging provides the ability to build communication solutions such as onboarding new channels (e.g., SMS, direct messages through a social network, etc.), building a communication assistant such as a translation bot, and integrating communication data into external business intelligence tools. Developers are able to build communication solutions that serve the needs of admins (e.g., an administrator may utilize a developer's solution to set up systems to more effectively monitor team performance and optimize processes) and representatives (e.g., a representative may use a developer's solution to provide customers with efficient and personalized service). The developers utilize clear and cohesive data models that include conceptual and data models mapped to models of a customer platform hosting omnichannel messaging. Plug and play functionality is provided for communication features and tools so that developers do not need to learn all the nuances of a platform. Administrators and representatives are provided with powerful communication tools with rich features and robust communication integrations that work effectively and efficiently. The communication solutions are integrated with existing workflows and tools such as automation and reporting, as well as customer and business data to provide context.

Figure 2:
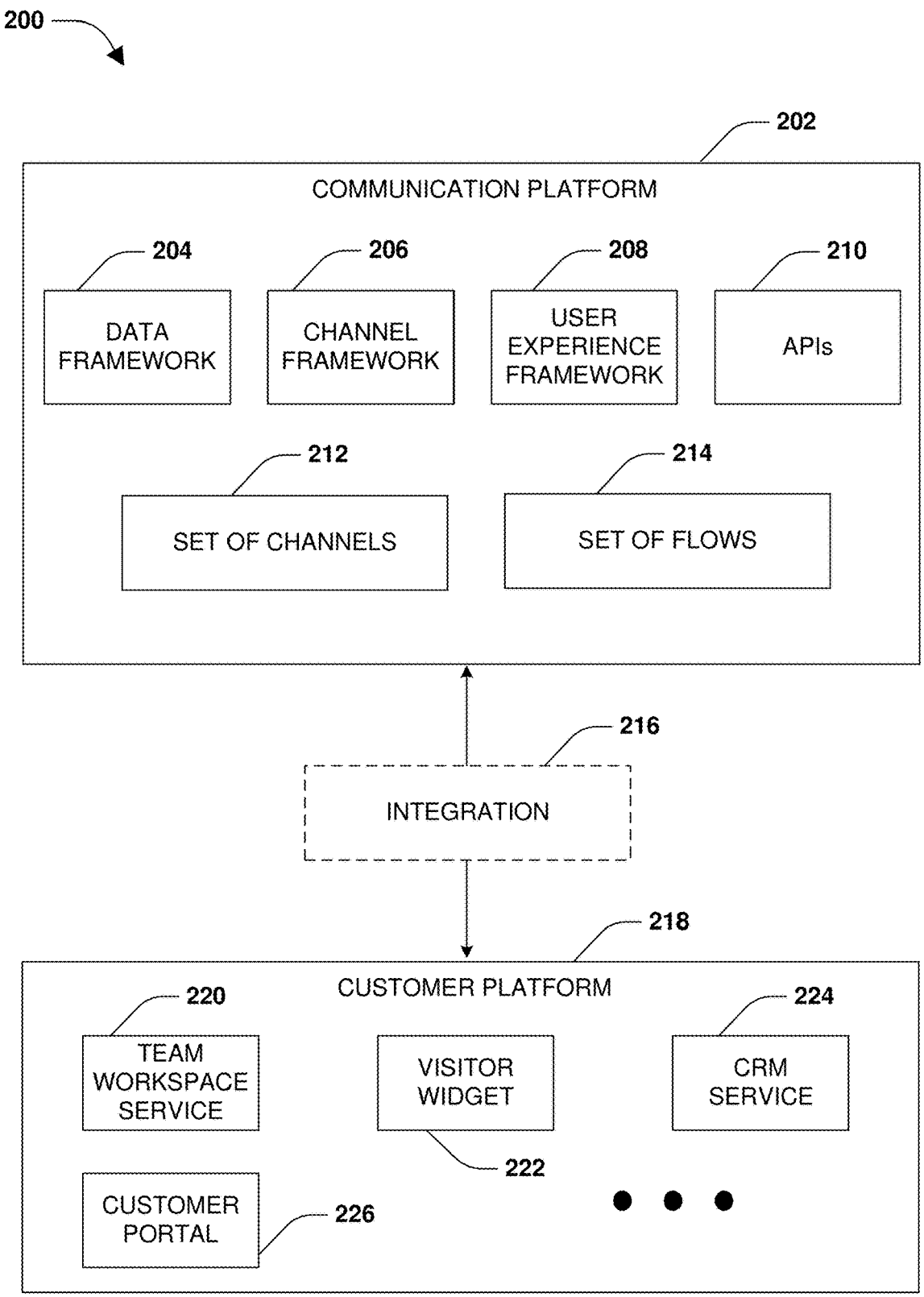
FIG. 2 is a component block diagram illustrating an example system for providing omnichannel messaging.

Omnichannel messaging may be implemented by a connected communication platform (e.g., communication platform 202 of FIG. 2). The connected communication platform provides centralized communication across a business such as where users (administrators and representatives) can manage communication in a single platform and seamlessly collaborate across different teams (front-office teams). The connected communication platform provides access to a wide variety of messaging features, such as where the users can operate from a central workspace without compromising on features or experiences. The connected communication platform provides a complete view of customer interactions where users can easily access customer data alongside conversations in order to provide contextual and personalized service. The connected communication platform provides users with the ability to connect to and seamless integrate communication into existing tools and processes of the customer platform (e.g., customer platform 218 of FIG. 2 and/or multi-service business platform 510 of FIG. 5) such as automation and reporting.

In some embodiments, a unified communication platform is provided to power communication related features and workspaces across the customer platform. The unified communication platform hosts a team workspace that provides message routing, bots, and ticket automation. The unified communication platform hosts platform tools that provide reporting, automation, and campaigns. The unified communication platform hosts CRM records that provide activity logging, record timelines, and contact properties. The unified communication platform provides unified messaging that works across the front office and supports unique cross team journeys (e.g., conversations with a customer by a team and conversations with the customer by a different team). The unified communication platform utilizes a CRM as a single source of truth where customer interactions (e.g., conversations of messages communicated through various communication channels) are stored through objects in the CRM, and customer data is leveraged to provide contextual and personalized experiences. The unified communication platform leverages and integrates with automation, reporting, data, content, etc. The unified communication platform is implemented as an extensible platform where new channels and messaging capabilities can be dynamically supported. The unified communication platform provides a single platform for developers to add communication channels. The unified communication platform reduces the time to integrate with email, chat calling, messaging, and other channels that can be leveraged by third parties. The unified communication platform provides a consistent experience where multiple different tools can be used for effective communication on any channel and in any workspace. Conversations can be easily transferred (handed off) between users and teams, and reports on communication activity can be shared. Complex automation can be built and applied to any number of channels at once.

The unified communication platform provides a channel framework. The channel framework is a technical infrastructure for capturing and storing channel data (e.g., messages and conversations that occur through various types of channels) that can be leveraged by communication workspaces and tools (e.g., a technical support workspace, a sales workspace, a human resources workspace, etc.). The technical infrastructure provides data models for capturing and storing channel information received from integrated channels. Public and internal conversation and channel APIs can be built on the data models for integration in communication systems of the customer platform.

A set of definitions, system maps, and guidelines are provided for how channels and channel data is to be integrated across systems of the customer platform. For example, a channel account may belong to a channel. The channel account can send and receive messages. A message has a sender(s) and recipient(s).

Integration of the channel framework includes multiple levels. Each level corresponds to language that can be used to align the scope and complexity of a product space and solution, and can be built in any order. A level 0 corresponds to building and connecting a channel. A level 1 corresponds to constructing basic functions of a channel in the team workspace. A level 2 corresponds to enabling team workspace features within the channel framework. A level 3 corresponds to integration of the channel framework with a CRM. A level 4 corresponds to enabling platform tools with the channel framework.

At level 0, a user (a developer) may define a new channel, define channel capabilities, building channel-side account connection and configuration, and publish channel integration within an app marketplace. Another user (an administrator) may connect any channel to a team workspace, and may connect channels across communication workspaces and tools.

At level 1, a user (a developer) can send an inbound message to the customer platform and may receive an outbound message from the customer platform. Another user (a representative) may view all message metadata, content, and attachments. The user may compose and send rich media message content and attachments (e.g., reply/start new conversations). The user may interact with messages (e.g., forward a message, react to a message such as liking or disliking a message). The user may view message statuses and/or errors. The user may respect subscriptions, message limits, and content abuse protection. The user may open, close, and/or move conversations. The user may switch between channels. Another user (e.g., an administrator) may configure channel specific settings (e.g., an email signature) at a tool or global level.

At level 2, a user (e.g., a developer) is provided with access to team workspace features for new channel integrations, and users are provided with more granular channel and message data for utilization by features of the customer platform. Another user (e.g., a representative) can utilizing messaging tools such as snippets and knowledge base articles on channels. Notifications of incoming messages across channels can be provided to the user. The user can search the team workspace by channel and message metadata search criteria. Another user (e.g., an administrator) can create snippets and templates for channels, setup routing automation for channels, create custom views using channel and message metadata, setup ticket automation for channels (e.g., automatically generate a service ticket when a message is received from a particular channel), setup bots on channels (e.g., have a bot respond to messages from one or more different types of channels), send feedback surveys on channels, and configuration notifications for channels (e.g., receive a notification when a message is received from a particular channel).

At level 3, a user (e.g., a developer) in provided with CRM integration with communication for new channel integrations. Another user (e.g., a representative) can store channel data (e.g., a social network handle) on contact records, associate or create contacts for conversations on channels, automatically associate contacts from incoming messages on channels, associate conversations with CRM objects (e.g., associate a conversation with a company object, a ticket object, a deal object, custom object, etc.), view conversations on channels on a CRM timeline (e.g., messages of a conversation are populated along a timeline based upon when the messages are sent or received), send messages on channels from a CRM record (e.g., reply or start new conversations from a CRM record such as through a UI element populated within a CRM contact object), and filter the CRM timeline and tables using channel properties (e.g., view messages from certain users, view messages received during a particular time period, view messages from certain channels, etc..

At level 4, a user (e.g., a developer) is provided with platform tools powered by communication for new channel integrations, and users are provided with more granular channel and message data for utilization by features of the customer platform. Another user (e.g., an administrator) can build reports using channel and message metadata on conversation objects, build reports using channel and message metadata on engagement objects, build workflow automation using channel and message metadata on the conversation objects, build workflow automation using channel and message metadata on engagement objects, and setup permissions on channel accounts across communication workspaces and tools.

In some embodiments, a channel capability is implemented as part of a system for team workspace features to dynamically render information based upon what functionality a channel supports and/or does not support as specified by the channel capability (e.g., an chat channel may allow real-time video sharing, whereas an email channel does not allow real-time video sharing). In some embodiments, the framework supports built-in channels, features, and workspaces of the customer platform. For example, SMS may be launched in the team workspace/team workspace (e.g., a workspace where helpdesk users can work on customer service tickets). The framework is configured to be compatible with the team workspace (e.g., a workspace where helpdesk users can work on customer service tickets) and supports features such as automated ticket creation. The framework supports group inbound calling that will be displayed through the team workspace/team workspace (e.g., a workspace where helpdesk users can work on customer service tickets). A universal channel connection/configuration is provided for external integrators for connection and integration into the framework so that the external integrators can build and iterate on channel APIs.

At level 0, developers can build channels, accessing public channel integration APIs, integrate channel capabilities, and plug into a channel and communication features. An administrator can discover and connect new channels for integration. Administrators can configure channels globally and locally by navigating and configuring channels for individuals, teams, and across an organization, along with managing and customizing configurations specific to a given channel.

At level 1, representatives can view message content and attachments, compose and send rich media message content and attachments, and interact with messages (e.g., forward, react, etc.). The representatives can organize and manage communication as conversations by threading related messages into conversations, seamlessly switching channels, and manage communication to protect against spam, abusive content, and contact subscriptions.

At level 2, administrators can setup team tools to work with channels, utilize tools such as snippets, templates, and knowledge base articles on channels, setup automation such as routing tickets, and setup bots on channels. A product team can build workspace features across channels that will seamlessly work with new channels, access channel data to power more sophisticated routing, bots, and ticket automation, and access granular channel data for building more nuanced workspace reports and custom views.

At level 3, representatives can view communication for any channel through a CRM system, automatically associate communication with existing contacts and log the communication to relevant records, view and send messages on record timelines, and filter and customize timelines using channel data. Representatives and administrators can capture contact information in CRM records, view different ways a contact can be communicated with through different channels, and obtain information of how contact information across different channels is stored in contact records via a standard framework. The representatives and administrators can manage associations on messages, manually associate or create new contacts for incoming messages from any channel, and associate communication to any CRM object.

At level 4, administrators can configure platform wide tooling using channels, setup platform permissions systems based on channel accounts, build cross-team reporting across different communication channels, and create conversational automation that spans across teams and workspaces. A platform team can build cross-team communication features that work with new channels and in any workspace, access a single source of truth for communication data across the platform, and access granular channel data to power more sophisticated automation and report tools access an entire business.

FIG. 1 is a flow chart illustrating an example method 100 for providing omnichannel messaging, which is described in conjunction with system 200 of FIG. 2. A customer platform 218 (e.g., multi-service business platform 510 of FIG. 5) provides various services (e.g., tools, systems 502-508, 1600, 520, 522-528, 562, 566, services 530, and a storage system 550 of the multi-service business platform 510) that may be utilized by users. For example, a client may utilize the customer platform 218 to provide its customers with services through the customer platform 218 and/or manage customer data through the customer platform 218. In some embodiments, the customer platform 218 provides a team workspace service 220 that hosts an team workspaces (e.g., a workspace where customer service agents can work on customer service tickets and communicate with customers) through which users of the customer platform 218 can send and receive communication provided by a communication platform 202 (e.g., messages received through channels configured through a channel framework 206), such as text message (e.g., SMS), email, social network messages, direct messages, chat messages, forum or blog messages, messages exchanged through a website (e.g., a chat message submitted by a customer through a chat UI of a business website regarding product support provided by a business), messages exchanged through an application, a form submitted by a user, etc.

Figure 5:
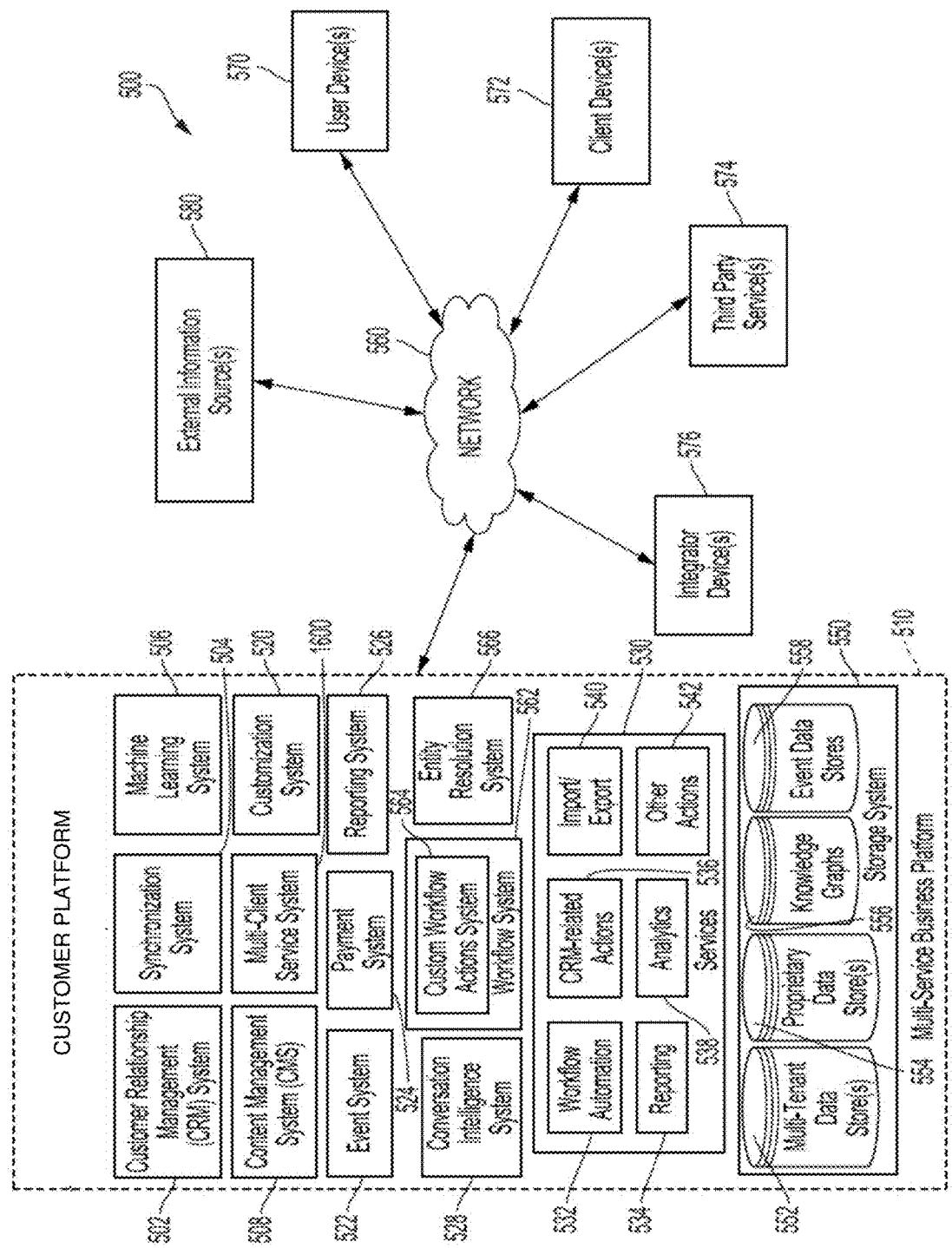
FIG. 5 is a block diagram illustrating an example of a multi-service business platform.

The customer platform 218 provides a customer relationship management service 224 (CRM service), which may be implemented as the customer relationship management (CRM) system 502 of FIG. 5. The CRM service 224 provides the client with the ability to store information and relationships through objects such as core objects and custom objects (e.g., a business can store information about customers, customer support tickets, sale information, financial information, human resource information, and/or other information related to running the business).

The communication platform 202 provides the ability to define channels 212 (e.g., message/communication channels) and flows 214 (e.g., workflows associated with messages) that are integrated 216 into the various services (systems) provided by the customer platform 218 (e.g., systems 502-508, 1600, 520, 522-528, 562, 566, services 530, and a storage system 550 of the multi-service business platform 510). The communication platform 202 provides application programming interfaces 210 that can be used to define the channels 212, the flows 214, and perform the integration 216. During operation 102 of method 100, the communication platform 202 utilizes the application programming interfaces 210 to create the channels 212, and connects (integrates 216) the channels 212 with the services of the customer platform 218. A channel (a channel configuration) is defined to specify how the channel is to interact with a service of the customer platform 218. A channel may correspond to a particular communication medium through which communication can occur, such as text message, email, social network messages, direct messages, chat messages, forum or blog messages, messages exchanged through a website, messages exchanged through an application, etc. Messages received through the channel may interact with a service such as a CRM service 224 in a particular way, such as where a conversation is identified and is stored within a conversation object through the CRM service 224 or how the conversation, which could span multiple different channels, is threaded together and displayed through a team workspace hosted by the team workspace service 220. In some embodiments, a channel integration application programming interface may be used to define and set a channel configuration for a new channel being defined through the communication platform 202. The channel configuration may specify a channel type (e.g., a social network platform), an account (e.g., a social network account), and capabilities (e.g., the ability to create a customer service ticket or trigger a workflow, the ability to share files through messages, the ability to comment or react to a message, the ability to perform real-time video sharing, etc.). In this way, the channels 212 may be defined using the application programming interfaces 210 of the communication platform 202, such as through a channel framework 206.

During operation 104 of method 100, a first set of flows of the flows 214 may be defined and formatted for sending and receiving messages across the channels 212. The first set of flows may be defined based upon native messaging experiences provided by the services of the customer platform 218. For example, a customer portal 226 may provide a particular native messaging experience where a user can submit a message through the customer portal 226 or can engage in a real-time chat with a bot or human. Messages received through various channels 212 can be formatted and provided through the customer portal 226 according to a native messaging experience (e.g., a message received through a social network account may be routed to a bot as part of the real-time chat for processing and generating a response). In some embodiments, a user experience framework 208 is used to discover and connect the channel to the service. In some embodiments, a data framework 204 is used to capture and store user accounts (channel accounts) for the channel. A user account (a channel account) may define a channel type (e.g., a chat app channel type), user account specific rules (e.g., filtering certain messages or senders), and/or user account specific settings (e.g., what types of messages will be routed to a particular service). The data framework 204 may be used to facilitate message composition, and provides the ability to perform text formatting, media handling (e.g., how to handle an image within a message such as if the image is to be saved to a CRM object or displayed through the customer portal 226 or discarded), attachment handling (e.g., how to handle an attachment of a message such as if the attachment is to be saved to a CRM object or displayed through the customer portal 226 or discarded), search for recipients (e.g., searching from messages across multiple channels that are directed to a particular recipient or from a particular sender), search for a particular channel, etc.

During operation 106 of method 100, a second set of flows of the flows 214 are defined and formatted for viewing and interacting with messages received/sent from the channels 212. The second set of flows are defined and formatted based upon a set of contexts with which the messages are viewed or interacted. For example, the second set of flows are defined for processing certain messages that are to be viewed and interacted with as part of a conversation thread for customer support or for purchasing a product.

In some embodiments, a channel may be integrated with a flow such as where when a message is received through the channel, the flow may provide a user with a notification of the message, the flow may perform automated routing of the message to one or more recipients, the flow may perform ticket automation to create a ticket (e.g., a customer service ticket) with details from the message and process the ticket using a ticket pipeline, the flow may perform automated reporting to generate a report based upon information within the message, the flow may perform threading to automatically generate a conversation object to include information within the message (or update an existing conversation object), etc. In some embodiments, a sender and/or a receiver may move (transition between) utilizing a channel according to a certain context to a different channel in the context (e.g., utilizing chat messages as part of creating or updating customer service tickets to creating or updating the customer service tickets using social network direct messages; viewing a message within a team workspace context to viewing the message within a CRM context).

During operation 108 of method 100, the flows 214 such as the first set of flows and the second set of flows are executed for processing messages received over the channels 212 such as by processing the messages utilizing services of the customer platform 218 for which the channels 212 are integrated. In some embodiments, the CRM service 224 is used to perform conversational automation and/or reporting for messages sent/received over a particular channel(s). In some embodiments, a selection of a user account (channel account) for a channel may be received. Accordingly, messages in a team workspace (e.g., a team workspace of the team workspace service 220) may be synced and sent during channel connection of the channel according to the user account. It may be appreciated that a variety of message processing may be performed, such as ticket creation, forwarding, threading, etc.

Figure 3:
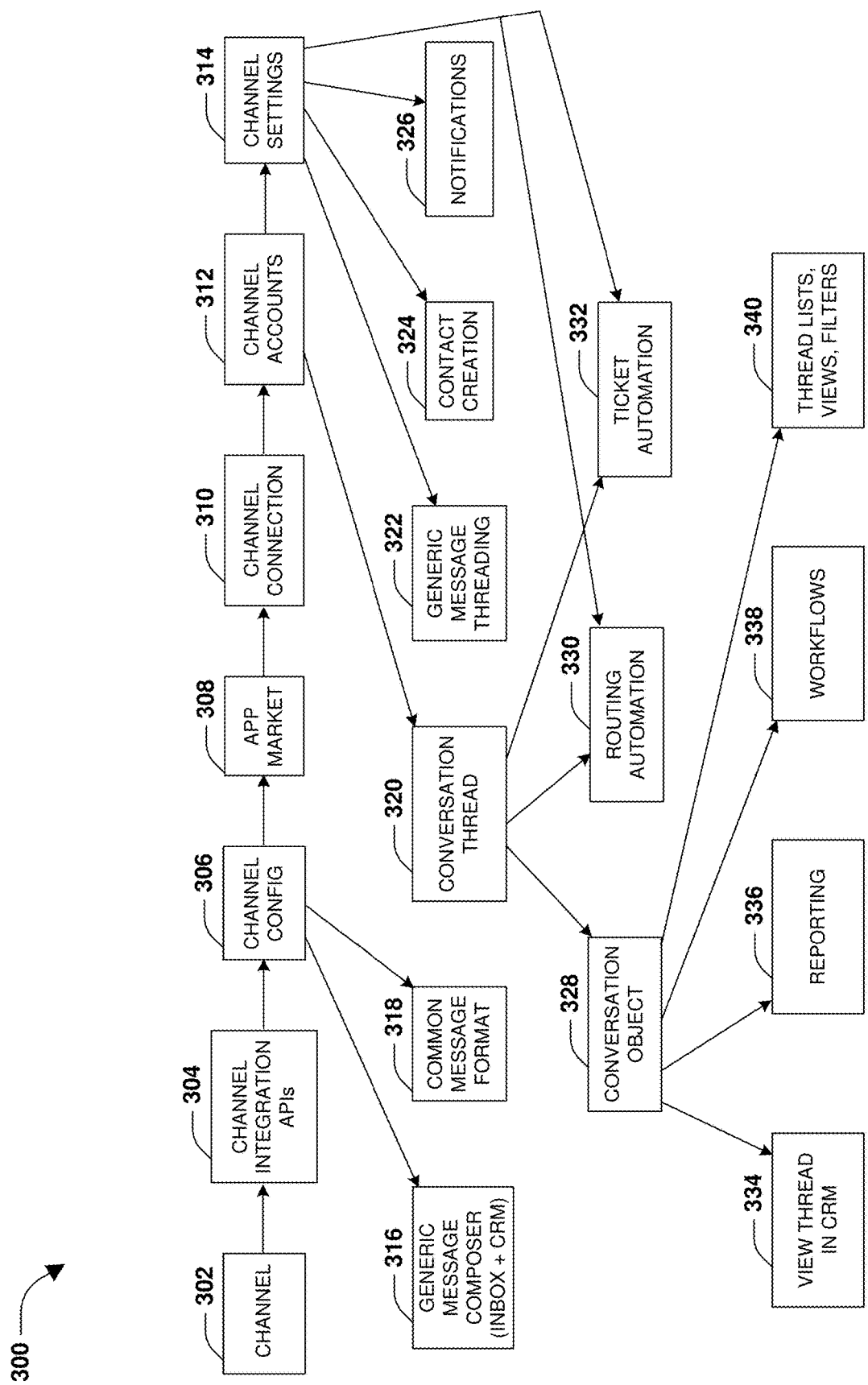
FIG. 3 is a flow chart illustrating an example method for providing omnichannel messaging.

FIG. 3 is a flow chart illustrating an example method 300 for providing omnichannel messaging. A channel 302 such as a $3^{rd}$ party channel may be constructed using channel integration APIs 304 provided by the communication platform 202 (e.g., application programming interfaces 210 and channel framework 206). A channel configuration 306 is defined for the channel 302. The channel configuration 306 may include a generic message composer 316 for how messages are composed and formatted through a team workspace and/or CRM. The channel configuration 306 may include a common message format 318 for how to format messages sent/receives across the channel 302. The channel 302 with the channel configuration 306 may be published through an app marketplace 308. A user may identify and install a channel such as the channel 302 through the app marketplace through a channel connection 310 that connects the channel 302 to channel accounts 312. The channel accounts 312 can be used to create conversation threads 320 in which certain messages can be threaded into a particular conversation.

Channel settings 314 may be defined for the channel 302 and channel accounts 312 connected to the channel 302 through the channel connection 310. The channel settings 314 may include notification settings 326 used to send notifications to recipients when messages are sent or received. The channel settings 314 may include contact creation settings 324 where a contact may be automatically created based upon a sender or recipient of a message, and the contact may be created as an object with the CRM service 224. The channel settings 314 may include generic message threading settings 322 for how messages are threaded into conversation objects 328 utilizing the conversation thread 320. The channel settings 314 may include routing automation 330 used to automatically route messages and conversations to recipients, which may be the same or different recipients than the recipients specified by the messages. The channel settings 314 may include ticket automation 332 used to automatically generate and/or process tickets (e.g., customer service tickets) through a ticket processing pipeline of the customer platform 218. The conversation threading 320 creates conversations that are stored as conversation objects such as a conversation object 328. The conversation object 328 can be used by the customer platform, such as by a view conversation thread through the CRM service 334, for reporting 336 of a conversation, for execution of workflows 338 through the customer platform 218, and for generating conversation thread lists, views, and filters 340.

Figure 4:
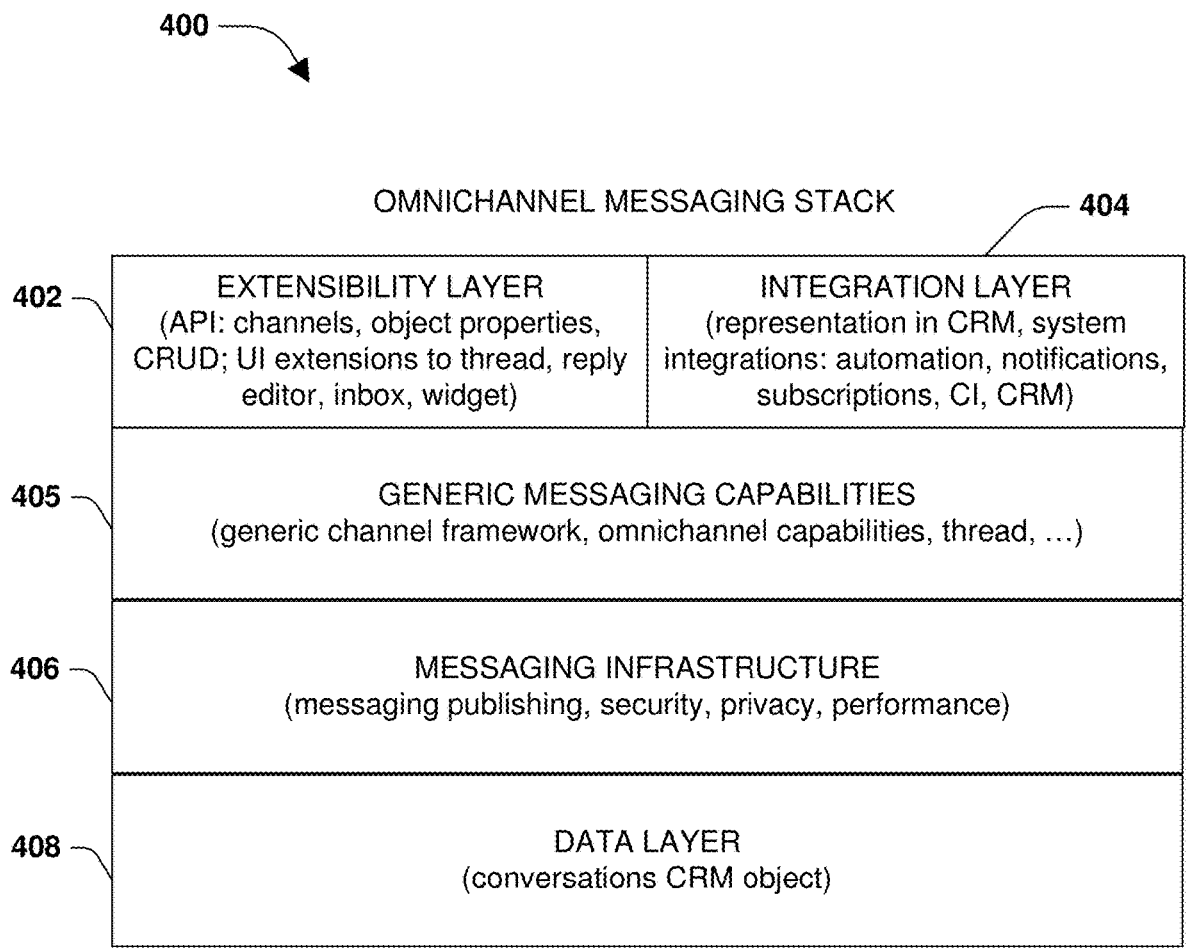
FIG. 4 is an illustration of an omnichannel messaging stack for providing omnichannel messaging.

FIG. 4 is an illustration of an omnichannel messaging stack 400 for providing omnichannel messaging. The omnichannel messaging stack 400 includes an extensibility layer 402. The extensibility layer 402 includes APIs related to channels (e.g., channel creation), object properties (e.g., properties of conversation objects), and create, read, update, and delete (CRUD) operations. The extensibility layer 402 includes UI extensions to access and utilize threads, a reply editor, a team workspace to view conversations and send conversations, widgets, etc. The omnichannel messaging stack 400 includes an integration layer 404. The integration layer 404 is used to provide a representation of a channel, message, and/or conversation in a CRM, and provides system integrations such as automation (e.g., workflow automation), notifications of messages being received or sent, subscriptions for certain channels, integration into CRM, conversation intelligence, etc. The omnichannel messaging stack 400 may include generic messaging capabilities 405 such as a generic channel framework (e.g., channel framework 206), omnichannel capabilities (e.g., the ability to receive messages from different channels), thread capabilities (e.g., the ability to create a conversation object of a conversation occurring over one or more channels), etc. The omnichannel messaging stack 400 includes a messaging infrastructure 406 that provides messaging publishing features, security, privacy, and performance. The omnichannel messaging stack 400 includes a data layer 408 used to create and store conversations CRM objects within a CRM database of the CRM service 224.

FIG. 5 is a block diagram illustrating an example of a multi-service business platform 510, such as the customer platform 218 into which the channels 212 and flows 214 may be integrated 216 by the communication platform 202, which will be subsequently described in further detail.

Figure 6:
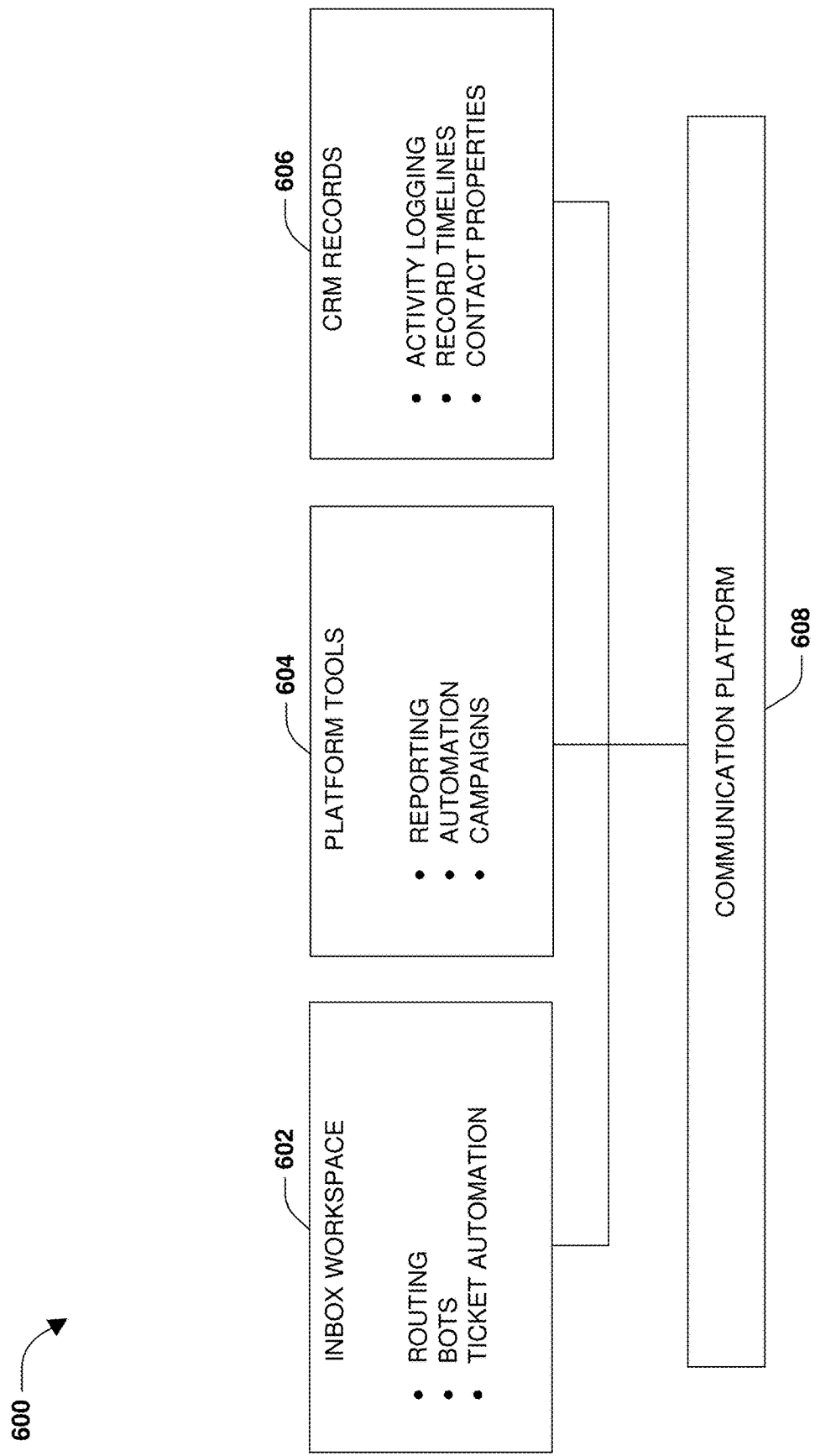
FIG. 6 is a component block diagram illustrating an example system of a communication platform for providing omnichannel messaging.

FIG. 6 is a component block diagram illustrating an example system 600 of a communication platform 608 (e.g., communication platform 202 of FIG. 2) for providing omnichannel messaging. The communication platform 608 may connect the channels 212, flows 214, and messages to a team workspace 602 such as for message routing, message handling by bots, and ticket automation where tickets are generated from message content and/or are updated/further processed through a ticket pipeline based upon message content of messages. The communication platform 608 may connect the channels 212, flows 214, and messages to platform tools 604 of the customer platform 218, such as for reporting (e.g., reporting out content within a message), automation (e.g., automating/triggering workflows based upon content within a message), and campaigns (e.g., messages related to a sales campaign).

The communication platform 608 may connect the channels 212, flows 214, and messages to CRM records 606, such as for activity logging (e.g., logging activities/events described in messages into objects), recording timelines (e.g., creating a timeline of when the activities/events occurred), and contact properties (e.g., associate a message with a contact object of a contact identified as a recipient or sender of a message).

Figure 7:
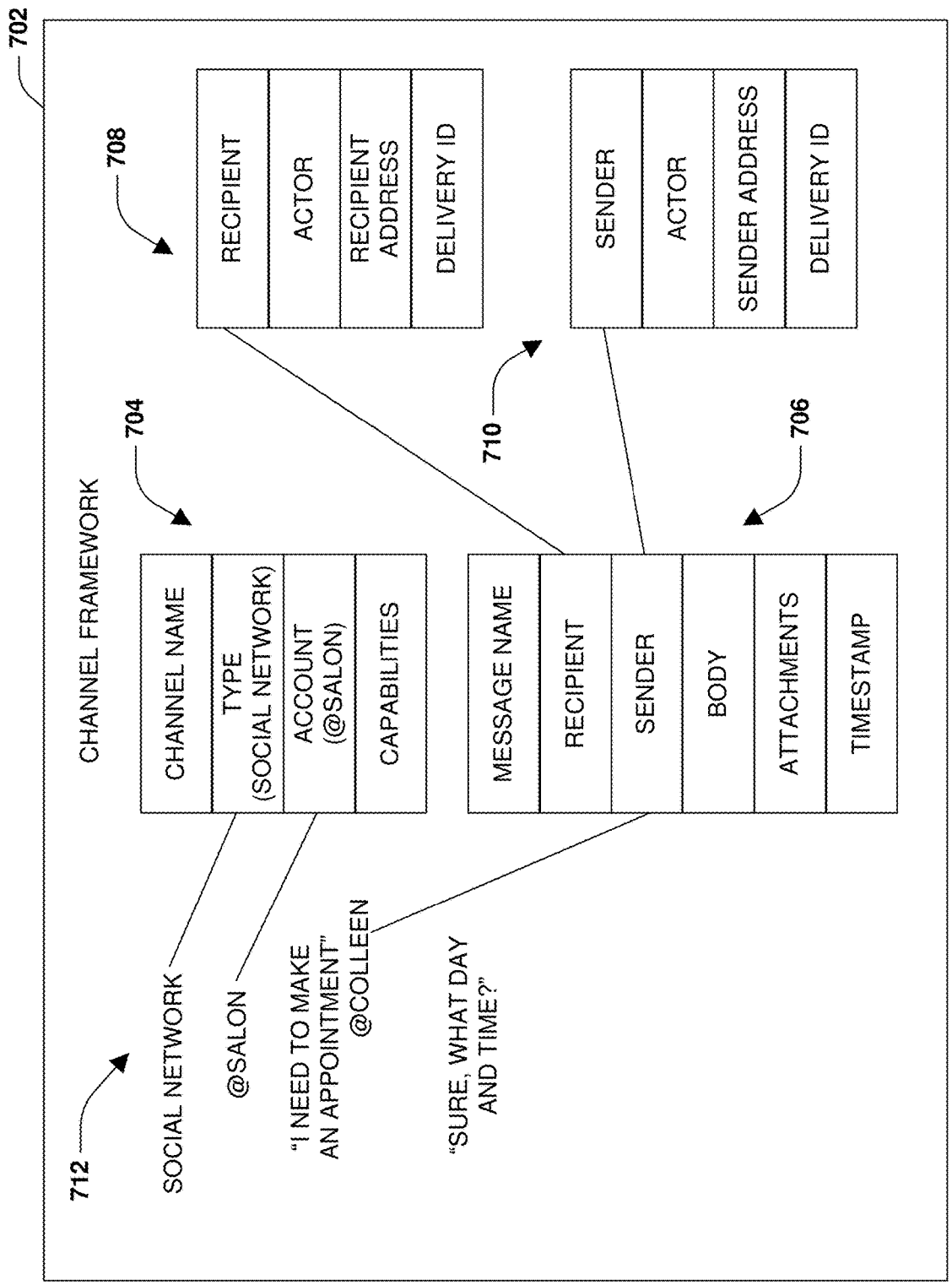
FIG. 7 is an illustration of a channel framework for providing omnichannel messaging.

FIG. 7 is an illustration of a channel framework 702 for providing omnichannel messaging. The channel framework 702 includes a channel representation 704 of a channel, which may correspond to a channel configuration. The representation 704 includes a channel name or identifier, a channel type (e.g., messages received through a social network), an account (e.g., a social network account such as @SALON with the social network), and capabilities (e.g., rich media attachments, multiple recipients, liking or commenting, sharing, linking to remote content, mentioning a user, place, or other account, real-time video sharing, adding users to or removing users from a conversation, etc.). The channel framework 702 includes a message representation 706 (a message object) of a message associated with a conversation 712, such as a message name or identifier, a recipient, a sender, a body (e.g., message content), attachments, and a timestamp. The recipient may be represented by a recipient representation 708 (a recipient object) that includes a recipient name or identifier, an actor (e.g., an agent such as a user of the customer platform, a visitor such as a customer of the agent, and/or a bot that is an automated messaging system), a recipient address (e.g., a social network profile, an email address, a phone number, etc.), and a delivery identifier. The sender may be represented by a sender representation 710 (a sender object) that includes a sender name or identifier, an actor (e.g., Colleen), a sender address (e.g., a social network profile, an email address, a phone number, etc.), and the delivery identifier.

Figure 8A:
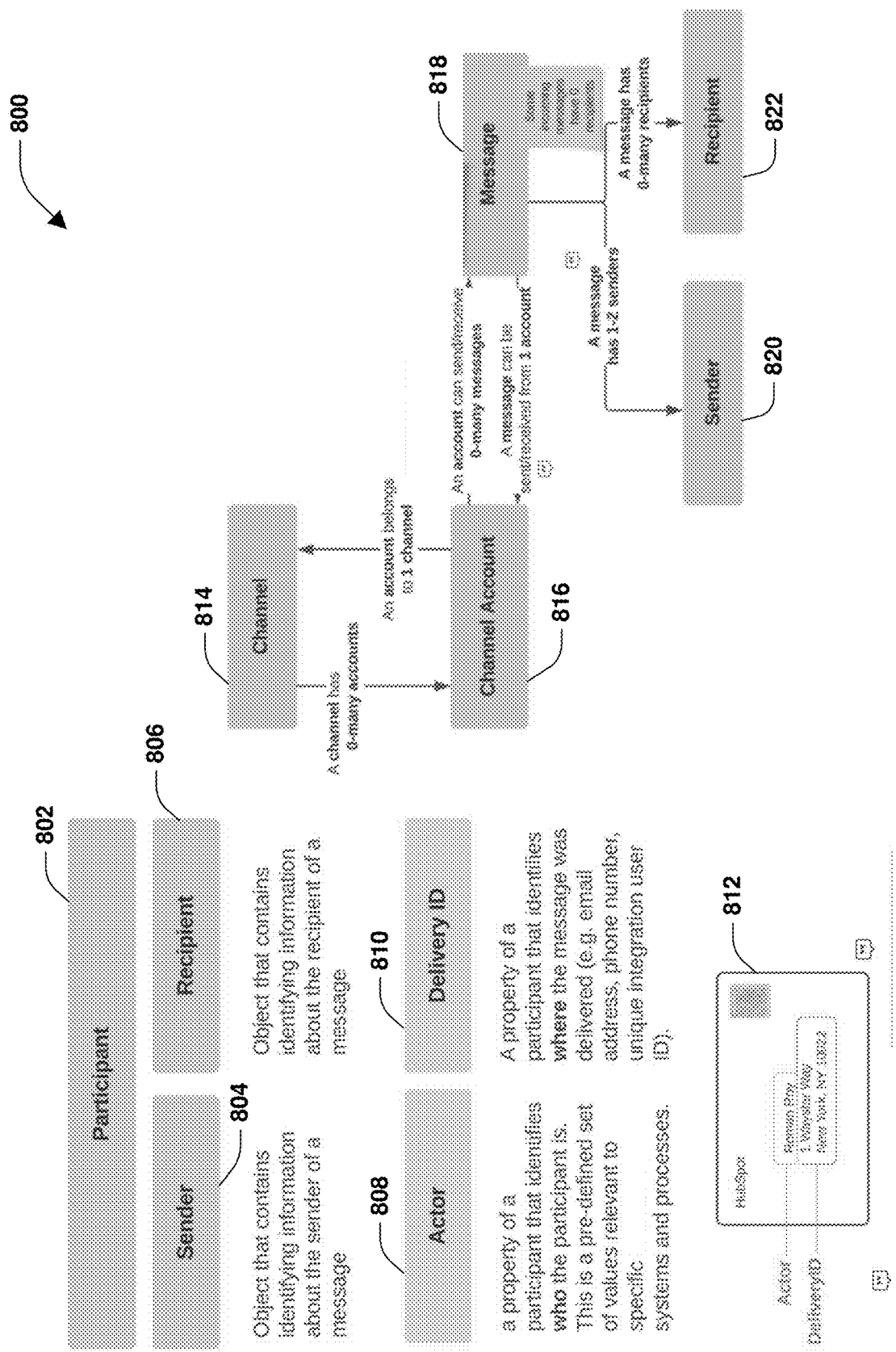
FIGS. 8A-8F are component block diagrams illustrating an example system for providing omnichannel messaging

FIGS. 8A-8F are component block diagrams illustrating an example system 800 for providing omnichannel messaging. FIG. 8A illustrates a participant representation 802 (a participant object) of one or more message participants of a message 812, which includes a sender representation 804 and a recipient representation 806. The sender representation 804 is an object that includes identifying information about a sender of a message, and the recipient representation 806 is an object that includes identifying information about the recipient of the message. An actor property 808 identifies the participant, which may be a pre-defined set of values relevant to certain systems and processes (services) of a customer platform. A delivery identifier property 810 identifies where the message was delivered (e.g., an email address, a phone number, a unique integration user ID, etc.). A channel 814 is associated with zero or more channel accounts, and a channel account 816 belongs to 1 channel. The channel account can send/receive zero or more messages. A message 818 can be sent/received from 1 account. The message 818 can have one or more senders such as sender 820 and can have zero or more recipients such as recipient 822.

Figure 8B:

FIG. 8B illustrates an object key 824 used to access a channel framework object, a CRM object, and/or other objects. The channel framework object may represent the channel framework 206 of the communication channel or platform, and the CRM object may represent a channel, a conversation, a message, a contact corresponding to a recipient or sender of the message, etc. A property key 826 corresponds to core content of an object such as a name, image, icon, and/or other core content that makes an object unique from other objects. The property key 826 corresponds to metadata about the object, which may be used for filtering or sorting. The property key 826 corresponds to nested objects correspond to object relationships between objects that are nested.

Figure 8C:
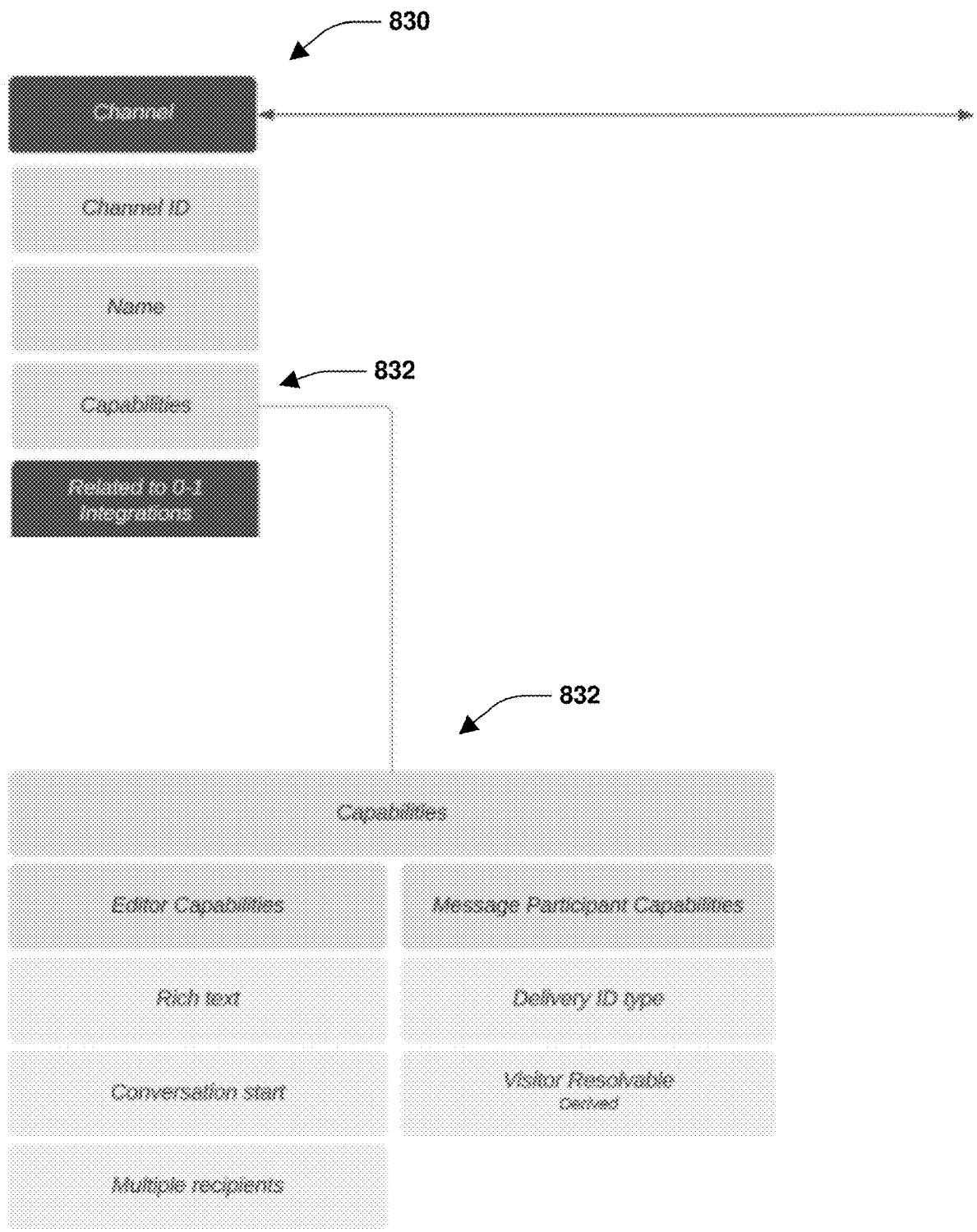

FIG. 8C illustrates a channel representation 830 (e.g., a channel configuration/object) of a channel. The channel representation 830 includes a channel identification used to display a channel name, icons, and/or logos throughout a user interface. The channel representation 830 includes the channel name. The channel representation 830 includes channel capabilities 832, such as editor capabilities (e.g., the ability to add rich text, start a conversation, include multiple recipients, perform real-time video sharing, commenting on a message, etc.) and/or message participant capabilities (e.g., deliver ID type and visitor resolvable related to the ability to identify a visitor that may send or receive messages through a channel of a website accessed by a visitor). The channel representation 830 may include a related indicators that may be set to a first value to indicate that the channel is part of the customer platform 218 or a second value to indicate that the channel is a third party channel (e.g., a third party channel available through an app marketplace). The channel representation 830 is used to deliver messages in and out of the communication platform 202 and/or the customer platform 218, such as through a team workspace or composer (e.g., a social composer used to create posts across different platforms such as different social network platforms).

Figure 8D:

FIG. 8D illustrates a channel account object 840 representing a channel account associated with a channel. The channel account object 840 includes a channel instance identifier, a channel name, a delivery identifier (an optional field), an active indicator to indicate whether the channel account IsActive, an IsAuthorized indicator to indicate whether the channel is authorized, a CreatedAt indicator, a belongs to a channel indicator, a connected to a portal indicator, a connected to team workspace indicator. Channel accounts are created and connected during team workspace and/or channel connection flow (e.g., connection of a channel to a team workspace where a user can access and view conversations and messages of the channel). Data from the channel account object 840 appears in a connected channels table in a team workspace settings of the team workspace, in thread messages, and/or in a reply editor as part of a sender option.

Figure 8E:
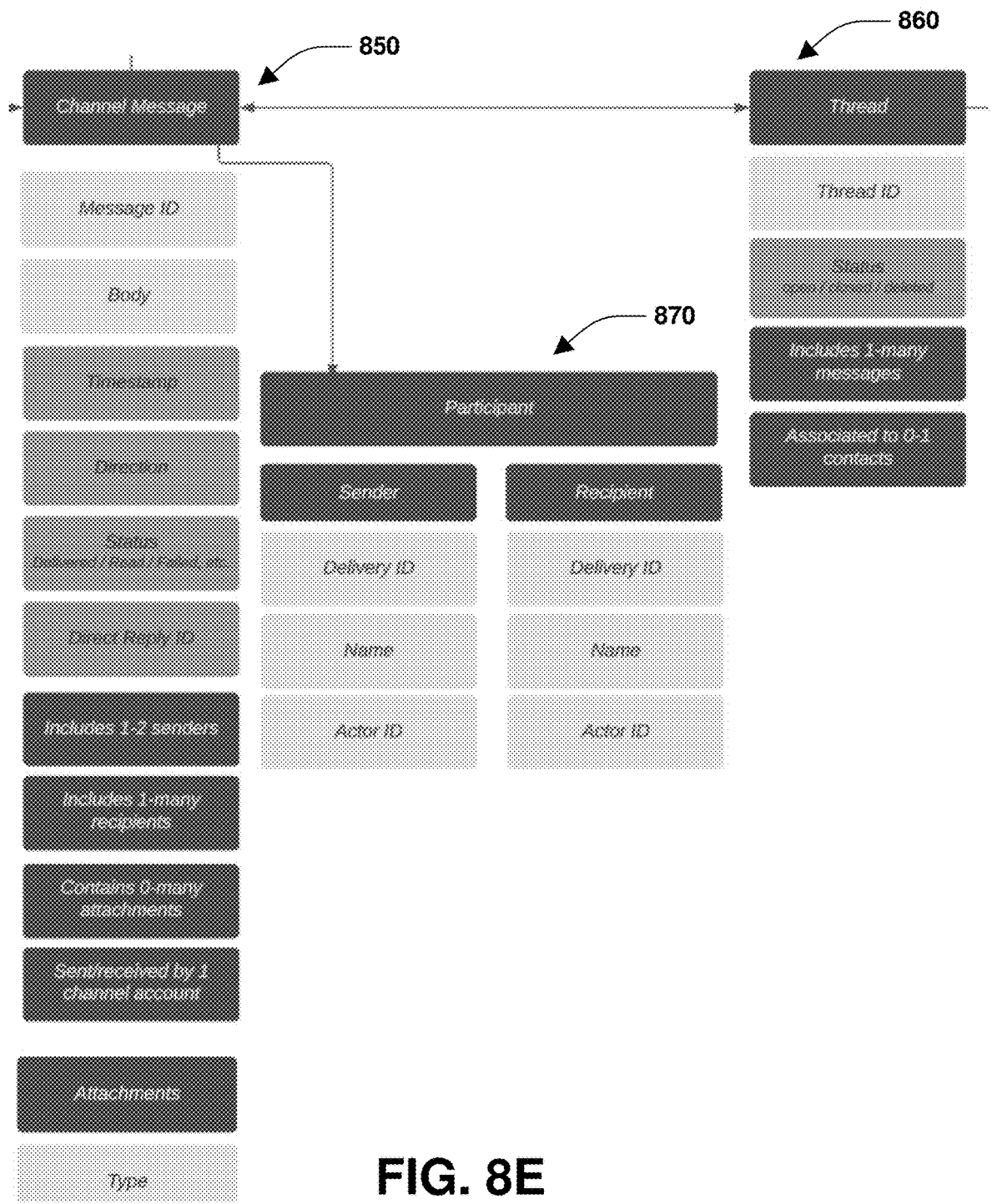

FIG. 8E illustrates a channel message object 850, a thread object 860, and a participant object 870. The channel message object 850 includes a message identifier, a body of a message, a timestamp of when the message was sent or received, a direction (e.g., received into the customer platform 218 or sent out from the customer platform 218), a message status (e.g., delivered, read, failed to deliver, etc.), a direct reply identifier of a reply to the message, a number of senders, a number of recipients, a number of attachments, and a sent/received by a particular channel account(s). The participant object 870 includes a sender object and a recipient object that are used in matching and creating contacts from messages (e.g., matching a message to a contact object within a CRM, creating a new contact object within the CRM from a sender or recipient of a message, etc.). The thread object 860 includes a thread identifier of a conversation thread, a status (e.g., opened for an open conversation thread, closed for a closed conversation thread, or deleted for a deleted conversation thread), how many messages are included in the conversation thread, and how many contacts are associated with the conversation thread (e.g., how many contact objects within the CRM are associated with senders and recipients of messages within the conversation thread). Various objects such as the channel message object 850, the thread object 860, the participant object 870, and/or other objects can be used to display conversation threads within an team workspace and within a thread list, create contact associations and perform contact promotion (e.g., utilization of an offer or temporary campaign to create interest or demand of a contact in a product of service), provide default views, perform message routing, and/or perform automated ticket creation.

Figure 8F:
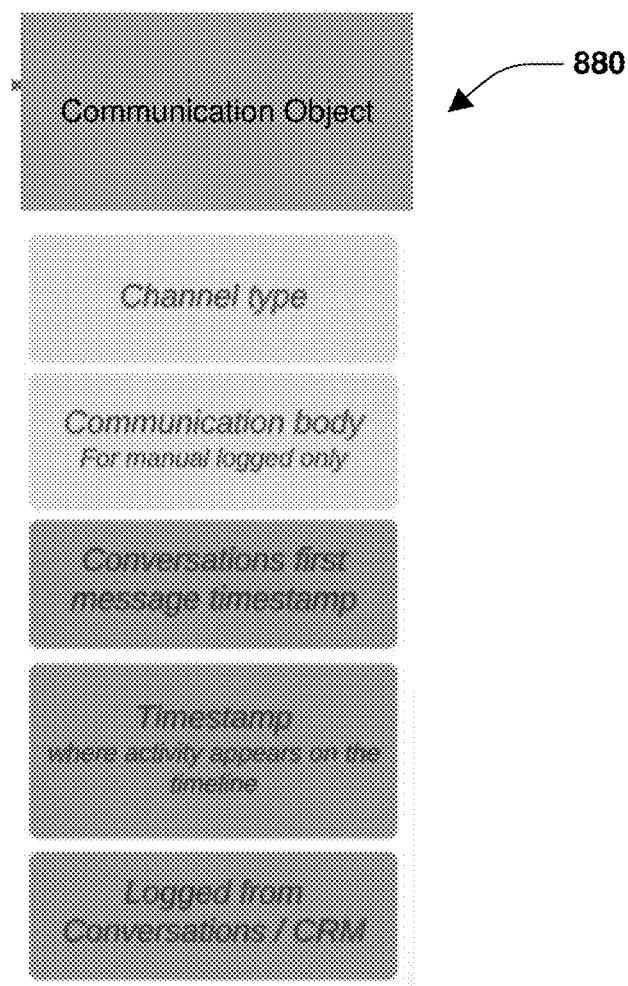
Figure 8F:
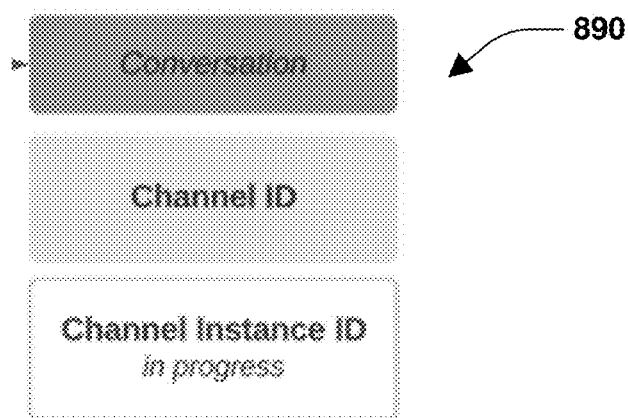

FIG. 8F illustrates an embodiment of a communication object 880 that includes a channel type (e.g., a communication app that allows users to send text messages, voice messages, video messages, make voice and/or video calls, sharing images, documents, user locations, and/or other content), a communication body (e.g., used for manual logging), a timestamp of a first message of a conversation, a timestamp where activities appear on a timeline, and whether communication represented by the communication object is logged from conversations or from data within a CRM. The channel type may relate to SMS, email, etc. The communication object 880 is used to format how conversations appear within CRM record timelines. The communication object 880 is used to create criteria for CRM record timeline filtering. The communication object 880 is used for surfacing activity and engagement properties through a reporting service of the customer platform 218 (e.g., a user responding with a troubleshooting activity performed by the user, a user sending a message inquiring about a product, etc.). The communication object 880 is used for surfacing activity and engagement properties through a workflows service of the customer platform 218. An email engagement object is used to facilitate ticket status automation, such as through a pre-built workflow using email properties. In some embodiments, the timestamp and logged from properties of the communication object 880 are used for determining how to display information on a timeline such as a CRM record timeline. A conversation object 890 includes a channel identifier and a channel instance identifier. The conversation object 890 is used to surface conversation properties through a reporting service or a workflows service of the customer platform, along with creating custom views in the team workspace.

Figure 9A:
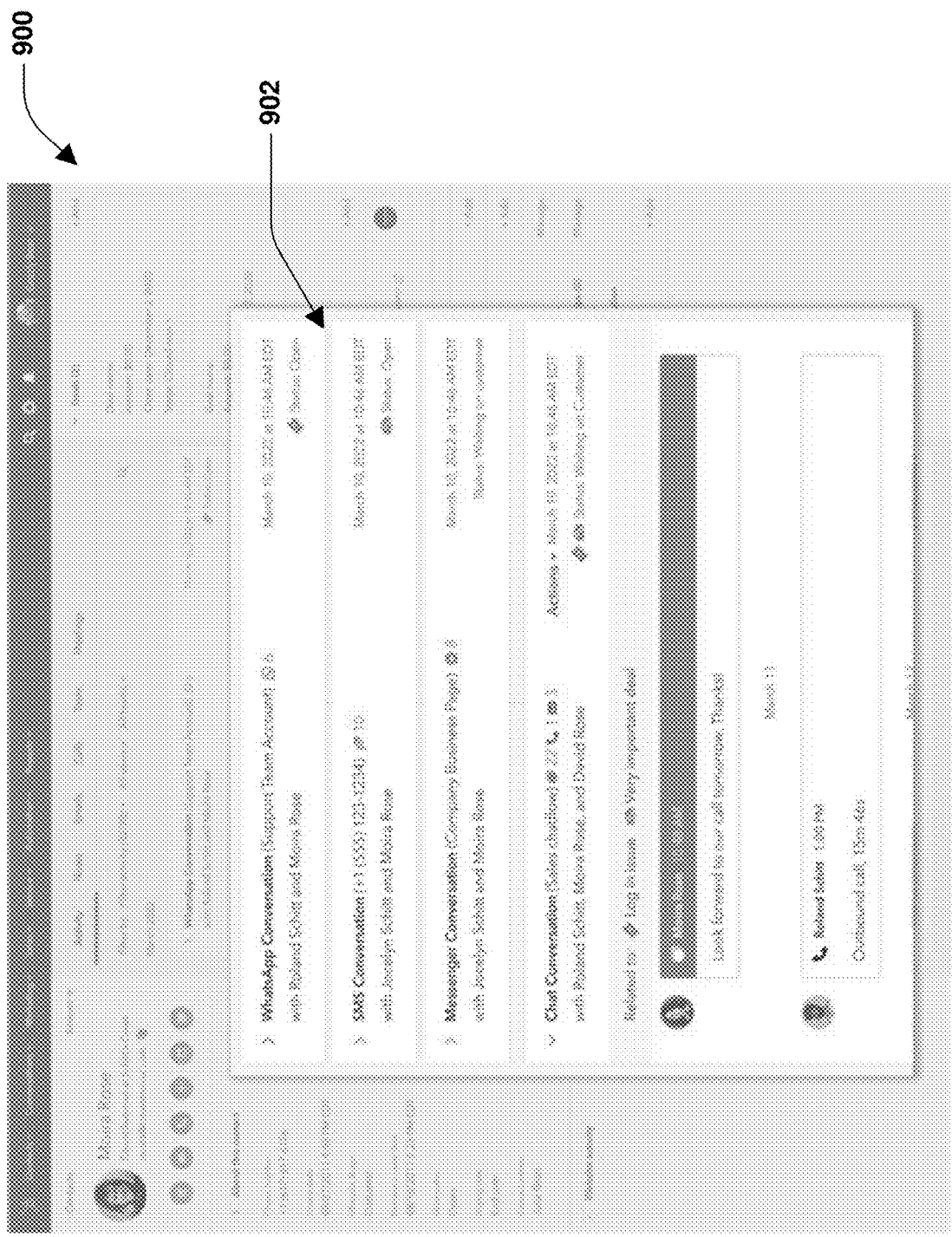
FIG. 9A is an illustration of a user interface associated with omnichannel messaging.
Figure 9B:
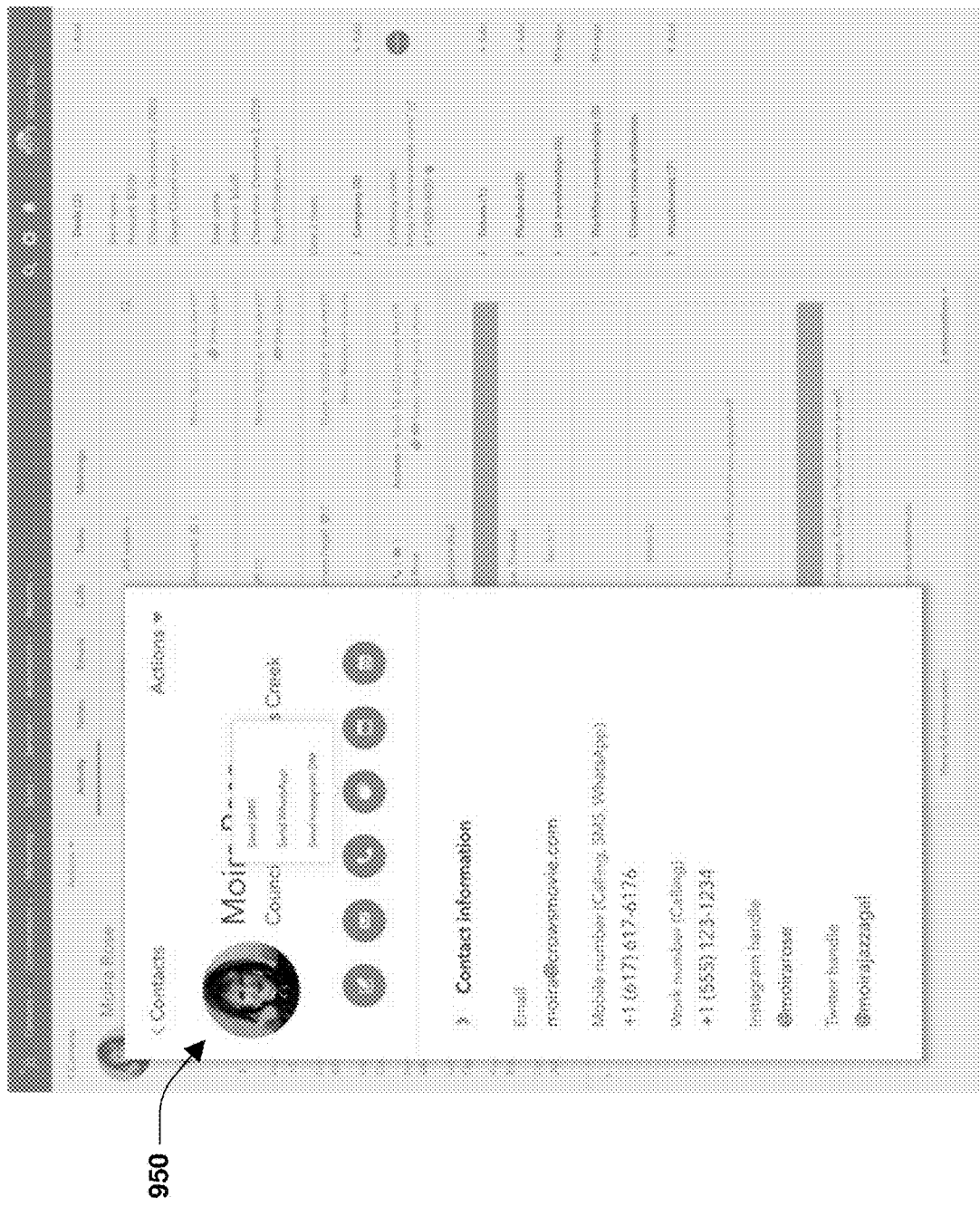
FIG. 9B is an illustration of a user interface associated with omnichannel messaging.

FIGS. 9A and 9B are illustrations of user interfaces associated with omnichannel messaging. A team workspace 900 provides users with the ability to view conversations and messages, such as a conversation 902 that includes message types (e.g., an SMS conversation, a messenger conversation, a chat conversation, etc.), status information, and/or a variety of other information. A contact user interface 950 may provide the ability to send messages directly from the contact user interface 950.

In some embodiments, an integration layer of a communication platform provides the ability to connect a channel (e.g., a third party channel available from an app marketplace) to a channel framework that provides communication features and represents communication over the channel through communication objects within a structural layer of the communication platform (e.g., conversation objects, thread objects, message objects, channel account objects, etc.). The communication objects are used by workspace features of a presentation layer such as a team workspace (e.g., a workspace where customer service agents can work on customer service tickets and communicate with customers)workspace and CRM records that include message routing, ticket automation, chatflows and bots, activity logging, and storing contact information such as into the CRM records. The communication objects may be used by platform features of the presentation layer such as for campaigns, automation, reporting, and/or other tools/services/systems of the customer platform 218. The communication platform provides a single data store and framework for channel functionality to power workspaces and tools that can be used by support teams, sales teams, marketing teams, etc. The communication platform provides a unified communication object model that provides consistent access to channel data and functionality in workspaces and tools of the customer platform 218, which allows for collaboration by multiple users.

The channel framework provides a technical infrastructure, rules, and user experience patterns for capturing and storing channel data that can be leveraged by the workspaces and tools (e.g., services and systems) of the customer platform 218. The technical infrastructure is the code base for capturing and storing channel information received from channels integrated into the channel framework. The rules and user experience patterns are used to connect the channel data to the workspaces and tools, such as by using patterns for associating messages to CRM contacts of how channel data is used to facilitate routing of messages and information. In this way, messages and conversations received through the channels can be used by the channel framework to setup team workspace tools that utilize message data.

In some embodiments, a channel is a medium for communication such as between agents and visitors (e.g., live chat, email, forms, a customer portal, a messaging app, a social network messenger, etc.). A channel can be bidirectional that supports incoming messages (sent by a visitor) and outgoing messages (sent by an agent to the visitor). A channel can be intake-only that only supports messages sent by a visitor (e.g., forms filled out by a visitor or a message sent through a customer portal). The disclosed communication platform (and channel framework) allow new types of channels (e.g., a new messaging app) to be defined and integrated into the customer platform 218 using various APIs such as a channel integration API. A channel configuration defines how a channel behaves and what features and capabilities are supported by the channel. As part of channel integration, the channel integration API provides the ability to define a configuration and capabilities of a channel, determine how messages of the channel are to be threaded into conversations, specify an endpoint to post new messages for the channel when hosted outside of the customer platform 218, and how to subscribe to webhooks to identify new outgoing messages from the channel sent from the customer platform 218 that need delivered to a recipient.

In some embodiments, a delivery identifier model is provided to support new generic channels that do not use explicitly supported identifier types but can support new identifier types. The delivery identifier model is integrated into a CRM framework of a CRM service so that generic channels can be integrated into apps, services, tools, and systems of the customer platform 218. A delivery identifier of the delivery identifier model defines where a message should be delivered within the context of a channel (where should the message actually be delivered such as an email address, phone number, or other identifier for a third party system).

One type of delivery identifier are invisible delivery identifiers that are not visible in the CRM (e.g., a social network messenger paged-scoped ID), which is treated as opaque strings, and channel identifier+a value is used to generate a unique tag ID for each visitor. A new DeliveryIdentifierType is created for the channel specific opaque identifier use case. Another type of delivery identifier are delivery identifiers mapped to one or more contact properties. These delivery identifiers can be either an explicitly defined DeliveryIdentifierType (e.g., a phone number) or a new generic DeliveryIdentifierType used to create (GENERIC_CHANNEL_PROPERTY). During channel configuration, channels can either specify an existing default contact property (e.g. a social network handle), or create a new channel-specific custom property to correspond to the delivery identifier. For specific types (e.g., a phone number), a set of default properties are specified and used for lookup (e.g., a calculated phone number) in addition to the other properties specified by the channel.

In some embodiments, domain model objects are updated with definitions for sender and recipient. A conversation includes the concepts of sender and recipient that are defined for any type of channel and messaging use case In some embodiments, every conversation message has at least one generic sender, and does not require both a delivery ID and an actor ID, thus there is a sender for all conversation messages. Sender information provides context for a message, but may not be a required field in some embodiments. A recipient is relevant in the context of a message being delivered to an external endpoint outside of the customer platform 218.

In some embodiments, a channel definition is used to define a channel. A channel is a medium for a customer and business to communicate with each other. A channel can either be bi-directional such as email, live chat, an app that supports various types of communication and data sharing. This means that agents using a team workspace (e.g., a team workspace service, app, or system of the customer platform 218) can send and receive messages on the channel. A channel can be an in-take channel such as where a user fills out a form or submits a message through a customer portal, which means agents using the team workspace can only receive messages, but cannot reply or can reply to a submitted form through a different channel such as email.

In some embodiments, channels are the backbone of the communication platform (framework) provided herein, and the channel definition provides a clear and consistent way to define a channel. If two different third party integrations (e.g., a third party integration of a channel) serve as connections to a same external messaging service (e.g., a messaging service external to the customer platform 218 such as a social network messenger app), the different third party integrations would be two unique distinct communication media and are treated as two unique distinct channels even if both connect to the same social network messenger app as the channel. For example, if two different third-party development groups each build integrations between the customer platform 218 and a signal messaging service, the two integrations would be two distinct channels, despite the fact that they both send messages through the signal messaging service, and may even both participate in the same signal message thread. One outcome of this is that external integrations may be restricted from reusing channel IDs that are reserved for integrations built internally. For example, if a third party wanted to build their own integration with a messenger app, then the third party would be restricted from using channel ID (the channel ID currently in use by the customer platform 218 own messenger app integration), and a new channel ID would instead be provisioned for the third party.

In some embodiments, live chat, email, social network messengers, messenger apps are channels defined according to the channel definition as a medium through which customers and businesses communicate with each other. Key characteristics include: Bidirectional communication—customers can reach out to businesses through these channels, and agents can respond to their customers over these channels; communication can be initiated by the customer on these channels; the channels are explicitly connected to an team workspace; some of these channels (e.g., email and the messenger app) support agents starting communication (composing) and some may not (e.g., live chat). This is a capability that can be configured at the channel level.

In some embodiments, forms can be configured to fit the channel definition because: communication can be initiated by the customer through a form; forms are a medium through which customers can contact businesses; forms are explicitly connected to a team workspace, and each form submission creates a thread in the team workspace, implying that each form submission is the start of communication and is expected to be actioned and responded to by an agent; and forms are an intake only channel, meaning this is a channel that customers can use to contact businesses, but agents cannot reply to a customer using a form. The forms channel has no implications for future concepts of forms as a message attachment that could be sent through other channels. In an example, while a customer is engaging in a live chat conversation through a widget, an attachment may be sent through the live chat channel. The attachment may be represented by an attachment representation/object separate from the live chat channel (a forms channel).

In some embodiments, a customer portal is implemented as an intake-only channel. Customers can start communication on a ticket without a current conversation from the customer portal and can initiate a conversation thread in the team workspace. The customer portal is explicitly connected to a team workspace, and is configured to connect to a specific team workspace. Customers can continue to send messages to the business through the customer portal throughout the conversation. In an example, agents cannot send messages directly to the customer portal, making this an intake only channel. In another example, a selected customer portal may be implemented as the primary destination for the messages, and thus the customer portal would become a bi-directional channel.

In some embodiments, comments may not be a channel, but are just a different type of message. Comments are not explicitly connected to a team workspace. Customers cannot view or send comment messages. Comment messages can be composed and sent from the team workspace, but this is not a defining characteristic of a channel.

In some embodiments, feedback in a feedback tool may not meet the definition of a channel. Feedback submissions themselves may not automatically create threads when the visitor submits feedback. This implies that feedback submission is not necessarily considered the start of communication with the business. Every feedback submission is not expected to be actioned or responded to by an agent. Threads are not created until the agent manually initiates a reply by email. Feedback submissions are just context that an agent uses to start an email conversation. Feedback could be changed to behave more like forms in that feedback surveys are explicitly connected to team workspace, and every feedback submission results in the creation of a thread that agents are expected to action, and thus feedback can be defined as a channel. Feedback can be collected over other channels (as opposed to it being a channel in itself). An example is post-chat feedback where feedback can be collected over the live chat channel or any other type of channel.

Some examples of new channels and non-channels include SMS, social network direct messages as channels with bidirectional communication where customers can reach out to businesses through these channels, and agents can respond to their customers over these channels. Communication can be initiated by the customer on these channels. A business messaging app that provides a workspace for real-time collaboration, communication, meetings, and file and app sharing may be integrated as a channel. Another example would be broadcast social tools. Similar to marketing email, a broadcast post is not the start of a conversation with all of the poster's followers. However, replies to the broadcast post could start conversation threads in the team workspace and be considered the start of communication, at which point these could be considered channels. Channels are the backbone of the generic framework provided herein. Features/behavior of the framework are based on channels. Comments are a supported feature in the team workspace.

In some embodiments, a channel instance is an object that represents the connection of an account for a channel to a specific team workspace. The channel instance object contains metadata for this account's connection, including an active state, a deleted state, and a name, as well as configuration such as routing rules and ticket rules that apply generally across channels. There can be multiple channel instances for the same generic channel in the same team workspace, and each generic channel will create and use channel instances in ways that specifically make sense for that channel. In an example, each email address that is connected to a team workspace corresponds to a channel instance. Each chat app business account number connected to a team workspace corresponds to a channel instance. Each chat flow (e.g., live chat and/or a social network messenger) connected to the team workspace corresponds to a channel instance for those channels. Each form connected to a team workspace corresponds to a channel instance. Certain channel configuration information may be channel specific such as the concept of a send from name for email. Any customer facing channel concepts are referred to as channel accounts.

Email is a channel. Each email address that is connected to a team workspace corresponds to a channel instance. These accounts are stored in the ConversationsEmail.connectedAccount vitess table, which has a channelInstanceId column. A connectedAccount table stores fields such as createdAt, isActive, deletedAt, inboxId, routingRulesId, and ticketRulesId, which overlap with fields on the channelinstance. In some embodiments, connectedAccount is the primary source of truth for these fields. In some embodiments, channelInstance is the primary source of truth for these fields.

Live chat and a social network messenger are channels with chatflows. Each chatflow corresponds to a channel instance and is connected to a specific team workspace. These objects are stored in the chatflows vitess table, which has a channelInstanceId column. The chatflows table stores fields such as name, active, routingRulesId, deletedAt, createdAt, inboxId, and chatflowSource (channelId), which overlap with fields on the channel instance. In some embodiments, chatflows are the primary source of truth for these fields. In some embodiments, channelInstance is the primary source of truth for these fields.

An instant messenger app is a channel. Each instant messenger app business account number that is connected to a team workspace corresponds to a channel instance. The instant messenger was built from the start using channel instances, so there is no overlap with other concepts. With the instant messenger app, the channel listing page pulls its information from channel instances.

Forms are a channel. Each form connected to a team workspace corresponds to a channel instance. These connections are also stored in a Team workspace (e.g., a workspace where helpdesk users can work on customer service tickets).connectedCrmObject vitess table, which has a channelInstanceId column. The connectedCrmObject table stores fields such as inboxId, createdAt, isActive, deletedAt, routingRulesId, and ticketRulesId, which overlap with fields on the channel instance. In some embodiments, ConnectedCrmObject is the primary source of truth for these fields. In some embodiments channelInstance is the primary source of truth for these fields.

A customer portal is a channel. Each customer domain connected to the team workspace corresponds to a channel instance. These connections are stored in the CustomerPortal.customerPortalSettings vitess table, which has a channelInstanceId column. The customerPortalSettings table stores fields such as isEnabled, pageTitle, createdAt, inboxId, which overlap with fields such as isActive, name, createdAt and inboxId on the channel instance. In some embodiments, customerPortalSettings is the primary source of truth for these fields. In some embodiments, channelInstance is the primary source of truth for these fields.

Channel source table refers to a source of truth in relation to a configuration for existing channels such as chatflows for live chat, connectedAccount for email, etc. The channel source tables store channel specific configuration that is specific to that channel. For example, chatflows includes fields such as language and priority that are not represented at the channel level and would remain relevant at the chatflow level. Similarly, connectedAccounts store email specific configuration such as sendFromEmail. These concepts may not apply to every channel and may be presented in a specific manner. Some fields that do overlap with channel instance fields.

Channel instance refers to the concept of naming, and channel account is the term used for customer facing usages. A channel instance includes a mysql table, API clients, BE models, message JSON, and references on the frontend an team workspace, widget, mobile, and/or customer portal An isActive field may be used based upon a restore action. isActive is a user-driven setting to specify whether messages should be ingested from this channel instance into the team workspace or not. In some embodiments, upon restore, the isActive field of the channelInstances was explicitly set to false. This action was taken for chatflows because if a chatflow is restored in an "active" state, it caused chatflow to render on the UI creating an unexpected user experience. For a forms channel, the isActive field controls the active connection of the form with the team workspace. So, if a form is restored in an "inactive" state, it would cause a form to not be connected with the team workspace and users would not be able to submit forms and create tickets. To address these issues, the behavior of channels upon a restore action is defined and is separate from how each channel behaves after restoration. Upon "restore", channelInstances are "undeleted" (e.g., only their deletedAt timestamp is changed to 0 with no change to the other fields). If this potentially affects a channel's normal behavior, a channel implementer is configured to combine the restore action with other actions to accommodate the difference.

isAuthorized Channel Property specifies whether the permissions to access the channel are shared with the customer platform 218. When a new channel instance is added or permissions to the channel are granted back, the isAuthorized field will be set to true. When a channelInstance is deleted, isAuthorized or permissions to the channel are revoked/lost and the field will be set to false.

In some embodiments, channel capabilities are a channel-defined guardrail around what messaging abilities are able to be used on a channel. The combination of a channel's defined capabilities provide the information used to successfully send and/or receive messages on a channel. Channel capabilities provide the ability to encompass feature-reach knobs that allow the communication platform (framework) to adapt to a conversation's team workspace behaviors in order to handle any messaging channel.

By defining a set of editor capabilities for text-based channels, capabilities can be used to adjust the team workspace editor to allow agents to send valid messages for the channel from the customer platform's team workspace (a conversations team workspace). Editor capabilities, therefore, define what that channel accepts as valid in the context of a message (e.g., a channel may not support attachments).

A channel's defined capabilities are used to inform other features of the conversations team workspace (e.g., for ticket creation or routing behavior), but are not be interchangeable with features of the conversation's product. Rather, channel capabilities provide information used to enable users to interact properly with the channel within the team workspace.

The capabilities framework are used by third party developers and internally with customer platform built channels. This means capabilities can have different levels of exposure based on the ability to support it within the team workspace. "Externally" visible capabilities are able to be viewed and adjusted by third party integrators. "Internally" visible capabilities are only visible inside the customer platform 218. As an example of the nuance mentioned above between a capability and a conversation's team workspace feature: routing and ticket creation are features of the customer platform 218, and not necessarily inherent abilities of a given communication channel. However, information about a channel that is captured via channel capabilities (e.g., "User Capabilities" that defines the expected availability pattern for a channel, such as by being "on demand" vs 24/7 available) may be used by the customer platform to inform routing behavior.

Channel Configuration refers to the process of defining or changing the capabilities of a specific channel. Some additional functionality relates to threading and business hours for routing.

In some embodiments, delivery identifier based threading is provided. For channels that display a single thread on the end user's side (e.g., SMS, a social network messenger, etc.), channels can be configured to opt into "Delivery Identifier Based Threading" to enforce that threading should be purely based on the participants involved in the thread (identified by their delivery identifiers). This threading logic is implemented by the communication platform (framework). This technique provides the ability to determine whether there is a valid thread open with a user before someone is allowed to start a new thread. In some embodiments, a rule is enforced that a single active thread can be opened between a channel instance and an end user at a given point of time in order to prevent a situation where two agents are talking to the same end user on two different threads. Other types of channels (e.g., email and live chat) may allow a visitor to start multiple threads with the same business, which can occur because agents may close threads when an interaction ends and there is an expectation that new threads will be started if the visitor reaches out about a different topic.

In some embodiments, a rule is enforced that there is no more than one active thread in the customer platform 218 between a channel account and an end user at one time. The rule is enforced so that agent messages from multiple threads are not interleaved at a visitors side UI, which could create confusion. The rule prevents a situation where an agent starts messaging a customer from the CRM service not realizing that the customer is already talking to someone else on another thread in the team workspace. However, other types of channels such as email and live chat are allowed to have multiple threads.

In order to enable this rule, an opt-in feature "delivery identifier based threading" is provided. For channels that opt into this feature: threading logic will be handled entirely by the customer platform 218 (and/or communication platform). This is different from channels that don't opt in, where integrators (e.g., a third party integrating into a channel) have some control over threading through specifying external ThreadIds to the customer platform 218

(and/or communication platform). Integrators do not specify externalThreadIds when opted into this feature. An externalThreadId is generated by the customer platform 218 (and/or communication platform) based on the delivery identifiers of the senders and recipients on the message. A maximum of one active thread will be enforced between the delivery identifiers at once.

For channels that do not opt into this feature, the channels will continue to provide opaque externalThreadIds that are used for threading. The main difference is that for delivery identifier based threading channels, the customer platform 218 (and/or communication platform) owns and defines that the externalThreadId is the same for any message involving the same set of participants. For non-delivery-identifier-based-threading channels, integrators own and define such, and provide the customer platform 218 (and/or communication platform) with multiple externalThreadIds representing different threads occurring between the same people. For example, a chat app is a delivery identifier based threading channel where: a messaging product group (acting as the integrator) will not provide any externalThreadIds, and will leave threading up to the customer platform 218 (and/or communication platform). The customer platform 218 (and/or communication platform) looks at the senders and recipients on each message, and generates the same externalThreadId when the same participants are involved.

Email is a non-delivery-identifier-based threading channel where: ConversationsEmail (acting as the integrator) generates externalThreadIds with their own threading logic, which may mimic how threads work in email clients. If the same person emails "support@ yourcompany.com" in two different email threads, ConversationsEmail will generate two different externalThreadIds. The same rules apply for both types of channels on how externalThreadIds behave. The key difference is that for delivery identifier based threading channels, the customer platform 218 (and/or communication platform) is enforcing that there's only a single externalThreadId for messages occurring between the same people. That restriction does not apply to channels not opted into this feature.

In some embodiments, this innovation provides a framework for integrating messages with customer data (e.g., integrating information within messages sent/received across various channels with objects within a CRM database). The framework takes the structure of different types of messages from different channels to enable various services of the customer platform 218 to perform functionality such as identifying and understanding a contact of a message (sender or recipient), and match the contact to a contact object within the CRM database, implementing automation based upon messages, and performing reporting based upon messages, while a developer does not need to understand the nuances between different types of channels. Instead, a user such as a developer can hook applications and websites into the framework, and the framework can automatically integrate messaging into the applications and websites through the framework. The user can build a channel as a private channel (a private business app) that can be connected to the framework. The user utilizes APIs of the framework to specify how the channel operates (e.g., structure of a message, capabilities of the channel such as whether the channel supports rich text, media, etc., and map the channel to the framework of how messages are structured). The framework utilizes the information about how the channel operates in order to power communication related features of the customer platform 218, such as how to automatically identify a sender/recipient of a message, match the sender/recipient to a contact in the CRM, use message data and/or corresponding contact data to create reports and build automation workflows (e.g., if message from contact A is received, then send out a message with a specific subject, message body, and/or attachments to one or more specified recipients and/or implement various functionality/actions). The framework utilizes the information about how the channel operates in order to identify a message and information about the message. The framework is message type agnostic and can work with any user defined channel.

If a business utilizes multiple channels (e.g., email, SMS, etc.), then the framework utilizes channel identifiers and channel names to distinguish between the different channels. In this way, different channels of the business can be handled differently based upon different capabilities of the channels (e.g., a user sending SMS message may be restricted from attaching a video to the SMS message that does not support videos, but may be allowed to attach the video to a chat message that supports videos). This information may be used to determine how to render a message composer for creating messages (e.g., a chat message composer may provide an attach videos option, while an SMS message composer will not), and what tools of the customer platform 218 can be used for composing messages based upon the particular channel capabilities of the channel so that message publishing and sending does not fail. As a result of connecting to a channel, associations can be automatically created such as between messages and CRM objects (e.g., contacts), workflows, and/or features of the customer platform 218.

Figure 10:
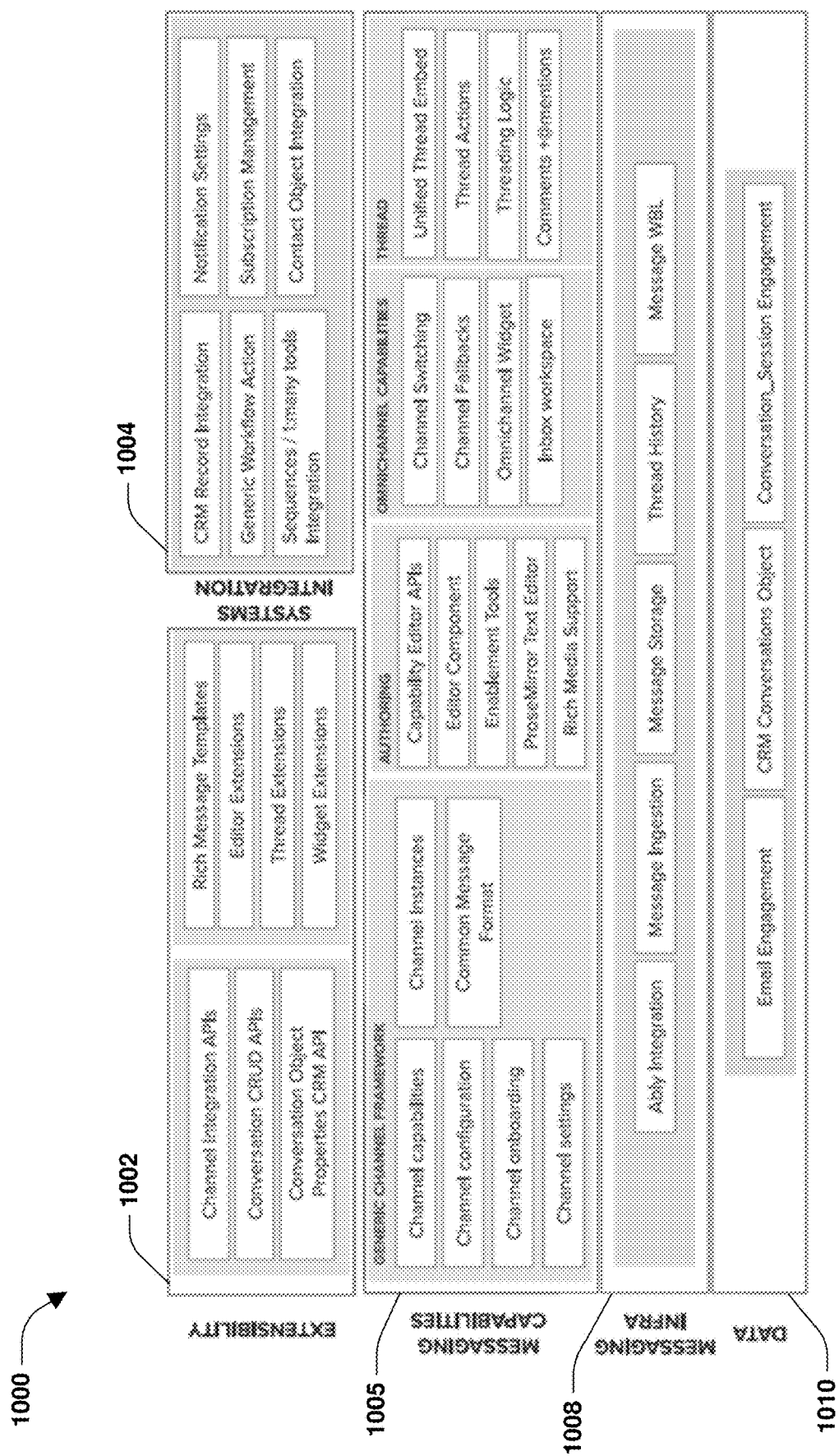
FIG. 10 is a component block diagram illustrating an example system of a communication platform for providing omnichannel messaging.

FIG. 10 is a component block diagram illustrating an example system 1000 of a communication platform for providing omnichannel messaging. In some embodiments, the communication platform comprises an omnichannel messaging stack that includes an extensibility layer 1002. The extensibility layer 1002 includes channel integration APIs, conversation create, read, update, and delete (CRUD) APIs, a conversation object properties CRM API, rich message templates, editor extensions, thread extensions, and widget extensions. The omnichannel messaging stack includes a system integration layer 1004. The system integration layer 1004 includes CRM record integration, generic workflow action, sequences and one to many tools integration, notification settings, subscription management, and contact object integration. The omnichannel messaging stack includes messaging capabilities 1005 such as a generic channel framework, authoring, omnichannel capabilities, and threading. The generic channel framework includes channel capabilities, channel configuration, channel onboarding, channel settings, channel instances, and a common message format. Authoring includes capability editor APIs, an editor component, enablement tools, a prose mirror text editor, and rich media support. The omnichannel capabilities include channel switching, channel fallbacks, omnichannel widget, and team workspace. The thread includes unified thread embed, thread actions, threading logic, and comments (e.g., +@mentions). The omnichannel messaging stack includes a messaging infra layer 1008 that provides ably integration, message ingestion, message storage, thread history, and message WBL. The omnichannel messaging stack includes a data layer 1010 that provides email engagement, CRM conversation objects, and conversation session engagement.

Referring back to FIG. 5, there is shown an example environment 500 including a multi-service business platform 510 such as the customer platform 218 for which the communication platform 202 and channel framework 206 integrate the channels 212 and flows 214 (e.g., may be also referred to as a multi-tenant distributed system that may serve the needs of multiple users who in turn use the system to provide services, support, and the like for their customers). The multi-service business platform 510 may communicate with various systems, devices, and data sources according to some embodiments of the disclosure. The multi-service business platform 510 may be referred to as a framework system or a multifunction business platform. The multi-service business platform 510 may include various systems 502-508, 1600, 520, 522-528, 562, 566, services 530, and a storage system 550. Specifically, the multi-service business platform 510 may include a customization system 520 (e.g., may also be referred to as a custom object creation system or custom object definition system). The customization system 520 may be used in a process to create custom objects and create associations for the custom objects.

These created custom objects may be used with various services 530 of the multi-service business platform 510 (e.g., may also be referred to as features of the multi-service business platform). In examples, services 530 may include workflow automation 532 (e.g., workflows), reporting 534, customer relationship management (CRM)-related actions 536, analytics 538, import/export actions or services 540, other actions 542, and the like. Other actions 542 may include, for example, filtering used to search, filter, and list objects (e.g., contact objects) that may be used with other objects and/or create lists for other types of objects. In some examples, other actions 542 may include reporting, permissioning, auditing, user-defined calculations, and aggregations. The multi-service business platform 510 may include a non-exhaustive list of services 530 (e.g., set of features) that may be changed and/or added to the multi-service business platform 510 over time such that these services 530 may be automatically used with old and new core objects and/or custom objects.

The multi-service business platform 510 may be used to provide all of the objects (specifically custom objects) with various capabilities from these services 530. These various types of services 530 may be applied and/or used with the objects. For example, the workflow automation 532 (e.g., workflow system) may be used to add verbs (automation actions) with respect to nouns (e.g., custom objects). The core objects and custom objects may take advantage of all these services 530 (e.g., features) such that there may be a single source of truth (e.g., objects) that the services 530 and/or other systems of the platform may reason about that may be built onto the multi-service business platform 510.

The storage system 550 may include multi-tenant data store(s) 552, knowledge graph(s) 556, and proprietary data store(s) 554. Custom objects and/or core objects may include information that may be stored in the multi-tenant data stores 552 of the storage system 550. The custom objects and/or core objects as well as possible relationships (e.g., associations) between objects may be stored in an ontology of the knowledge graph(s) 556 at least implicitly and one or more instance knowledge graphs may be included in the knowledge graph(s) 556.

The multi-service business platform 510 may include other systems that may be used with the created custom objects such as a customer relationship management (CRM) system 502, a synchronization system 504, a machine learning system 506, a content management system (CMS) 508, and a multi-client service system 1600 (as described in the disclosure above). These systems may function and/or be used similarly to the same or similar systems described in the disclosure. For example, the machine learning system 506 that may already be used with core objects may also be applied similarly to the custom objects. The synchronization system 504 of the multi-service business platform 510 may synchronize some arbitrary custom objects outside the platform 510 to objects in the platform 510. In summary, in examples, the multi-service business platform 510 may act as an arbitrary platform that may act on arbitrary custom objects using various systems 502-508, 1600, 520, 522-528, 562, 566 and the services 530 (e.g., used with arbitrary actions and synced to arbitrary systems of the platform) thereby benefiting from these various capabilities.

The multi-service business platform 510 may communicate with external systems and data sources via a communication network 560 (e.g., Internet, public network, private network, etc.). Specifically, the multi-service business platform 510 may communicate with user device(s) 570 (e.g., user may be using the customization system 520 from the user device 570 to create custom objects via network 560), client device(s) 572 (e.g., tracking various activities of the client device 572 of a customer for purposes of sales and marketing with respect to custom objects), and various external information sources 580. The external information sources 580 may include company information or data on customers, products, sales, third party data, resource description framework (RDF) site summary (RSS) feeds or really simple syndication (RSS) feeds, telemetrics (e.g., from email, websites, app usage), and the like with respect to custom objects. The multi-service business platform 510 may also communicate with third party service(s) 574 (e.g., third party applications, websites, Snowflake, etc.) via network 560.

The multi-service business platform 510 may also communicate with integrator device(s) 576. Integrator devices 576 may refer to user devices used by third-party integrator users that may create and may define a series of custom objects that may be integrated with other objects in the multi-service business platform 510 and may be offered to users (e.g., clients) of the multi-service business platform 510. The multi-service business platform 510 may include APIs (as described in the disclosure) that a user may use to define custom objects and integrate those custom objects into the CRM (e.g., CRM system 502) and thereby into the multi-service business platform 510. These same APIs may be available to integrator users to do the same thing. The integrator users may define a series of custom objects, then the integrator users may define object definitions. When a client installs that integration, the multi-service business platform 510 may enable the client (e.g., users of the client) to then start creating instances of custom objects defined by the integrator user(s).

Using yoga studio example again, an integrator user may have a company that builds CRM integration for yoga studios. This company may not be a yoga studio itself but may provide the CRM integration. For example, the integrator user may define a set of custom objects (including properties) that may be used by yoga studios or other fitness class-based businesses. The custom objects may include a studio custom object, an instructor custom object, a student custom object, a class custom object, and a schedule custom object. In this example, any client of the multi-service business platform 510 that operates a yoga studio (or other fitness, class-based business) may use the custom objects defined by the integrator (e.g., for a fee to the integrator) when on-boarding their business to the multi-service business platform 510. For example, the yoga studio users (e.g., from yoga studio businesses) may install integration (e.g., CRM integration from the integrator user) to be used on the multi-service business platform 510. After integration, the yoga studio users may be able to take advantage of the custom objects (e.g., custom definitions of the custom objects) created by the integrator user such as the "yoga class" custom object, the "yoga instructor" custom object, and the "yoga student" custom object. The yoga studio users may also have access to the services 530 of the multi-service business platform 510 such as reporting 534 (e.g., user reports), workflow automation 532 (e.g., user workflows), etc. that may be used with these custom objects. It may be as if each yoga studio user may rely on the integration from the integrator user such that the integration may be packaged with the custom objects and definitions for users of the multi-service business platform 510.

The customization system 520 and the storage system 550 are used to create custom objects. In some examples, the customization system 520 may be a development tool such as a "generic data representation" system. In examples, the multi-service business platform 510, as described in the disclosure, may be a collection of processes that work over or on top of the customization system 520 (e.g., specifically APIs of the customization system 520). This may mean that a custom object created in and/or by the customization system 520 (e.g., including properties related to the custom object) may be immediately used by the services 530 and/or systems 502-508, 1600, 520, 522-528, 562, 566 of the multi-service business platform 510 to execute various tasks.

In some embodiments, as shown, the customization system 520 may use application programming interfaces (APIs) as a computing interface to communicate and interact with users via the user devices 570 and/or integrator users via integrator devices 576. The customization system may include and use an object schema service for providing a data application programming interface (API) such as an object definition API for receiving custom object information from the user devices 570 and/or integrator devices 576. The object definition API may be a CRM definition API, an object schema API, CustomObject data API, or a new schema API (e.g., user may create new schema API which may be defined as a form when filling out this API). The object definition API may be used for communicating the custom object information with the customization system 520 in creating custom objects. These data APIs (e.g., object definition APIs and/or APIs) may be "generic data representation" APIs that may be used by users (e.g., via user devices 570), integrator users (via integrator devices 576), and/or developer engineers (via multi-service business platform 510) to express a data model that may exist within the multi-service business platform 510 (e.g., framework).

The customization system 520 may include other services, components, and/or modules that may be used in the process of creating custom objects. For example, the customization system 520 may receive a user request for a custom object creation including custom object information (e.g., custom object name, an object type, at least one property of the custom object, and an association of the custom object with another object) from a user device 570 via the APIs. For example, the customization system 520 may include a form filling service for receiving the custom object information for the custom object. For example, the form filling service may provide a form (e.g., via a GUI) that may include prompts (e.g., spaces in a form) for the user to submit or input custom object information that may include a name (e.g., fill out name), a label, and basic information such as properties (e.g., description information about properties which may be similar to core value or core structure of metadata for the custom object being defined). Development documents may be used, or the user may use their own client for the form. In summation, the user may use the APIs, a custom object may be created, and then the user may login to the multi-service business platform 510 to monitor how custom objects may be integrated with the rest of the multi-service business platform 510.

The customization system 520 may include and may execute a business logic/sensible default service (e.g., may use business logic and/or sensible defaults) to interpret custom object information in order to convert the custom object information into custom object metadata. The customization system 520 may include and use a relational database management service (e.g., structured query language database service such as open source MySQL™ database service) to insert and store the custom object metadata into a relational-type database (e.g., relational database management system). The customization system 520 may convert the custom object metadata into language-independent data creating a custom object. The custom object may be sent in language-independent data form to the user device 570 and/or services of the multi-service business platform 510, for use with marketing processes, sales processes, and/or customer service processes. For example, each custom object may be viewed by the user as a record on the user device 570 from the multi-service business platform 510. The customization system 520 may also include a common data format conversion service that may assist with synchronization and integration of the custom object within the multi-service business platform 510 (e.g., integration of the custom object with the services 530 of the platform 510).

The customization system 520 may also communicate and direct changes to data on the storage system 550 when creating custom objects. Specifically, the multi-tenant data stores 552 of the storage system 550 may include definitions, properties, values, instances, and associations for all objects (e.g., including custom objects and core objects). These multi-tenant data stores 552 may be changed by the customization system 520 when creating custom objects. The storage system 550 may include knowledge graph(s) 556 such as an instance knowledge graph. The knowledge graph(s) 556 may also include, at least implicitly, an ontology. The ontology may include the custom object with other custom objects and/or core objects (e.g., contact objects, company objects, deal objects, and/or ticket objects) along with one or more associations (e.g., as added or selected associations by the user) between the objects. Similarly, the instance knowledge graph may include an instance of the custom object with other custom object instances and/or core object instances along with one or more association instances between the object instances based on monitoring of activities of actual entities corresponding to these objects. Instances of objects (e.g., instances of custom objects and/or instances of core objects) may be referred to as records.

The multi-tenant data stores 552 (e.g., which may include one or more databases) may be updated when adding custom objects. As described in the disclosure, the multi-tenant data stores 552 of the storage system 550 may include definitions, properties, values, instances, and associations. In some examples, the multi-tenant data stores 552 may include a set of data stores that collectively support custom objects and that may be updated by users of the multi-tenant data stores 552. For example, one data store may be a definitions data store that may be a system of records for storing objects and respective object definitions (e.g., list of core objects and custom objects). This definitions data store may be a definition of what objects (e.g., custom objects and/or core objects) exist. This definitions data store may include a list of objects, e.g., contacts, companies, deals, tickets, and custom objects (e.g., line items, products, etc.). This list of objects (e.g., custom objects) may also include and relate to any integrations that the user may have installed that define custom objects and any other custom objects that the user may find in their data (e.g., list of the tabs in a spreadsheet for user). Another data store may be a properties data store that may be a system of records for storing properties of custom objects such as tracking properties or attributes of custom objects as well as properties of core objects. Another data store may be a values data store that may be a system of records for tracking values of properties. The larger multi-tenant data stores 552 may not discriminate based upon a user ID or a custom object itself. In some examples, each data store may include one or more databases.

In some embodiments, for the definitions data store, the system of record for what custom object types exists may be a "used car". The properties data store may include properties or attributes that may include color, make, model, year, etc. for the used car custom object. The values data store may refer to the user, particular car, object type (e.g., which may be a car), related ID, property (e.g., car is red), etc. that may be laid out in such a way that the user may be able to dynamically create, edit, and remove values data of custom objects. Also, the user may be able to dynamically create, edit, and remove object properties and the user may dynamically create, edit, and remove properties (e.g., property values) of custom objects. This may provide flexibility immediately in terms of the user creating, editing, and/or removing custom objects, definitions of custom objects, and/or properties of custom objects.

In some embodiments, the definitions and properties data of the multi-tenant data stores 552 may be located in a relational-type database such as relational database management system (e.g., structured query language database such as open source MySQL™ database) such that most of the data may be stored using a JavaScript™ Object Notation (JSON) (e.g., web-based tool JSON blob) to assist in creating, editing, viewing, formatting, and sharing JSON. The various metadata may be stored as columns for efficient indexing and queries. JSON may be used as data format such that JSON may be an open standard file format and data interchange format that may use text to store and transmit data objects. Other data formats may be used to accomplish the same or similar functionality described in the disclosure. In some examples, the values data store may be run by a non-structured query language (SQL) (NoSQL) or non-relational key value database which may be a similar database to Google™ Bigtable™ database.

The multi-tenant data stores 552 may include database storing metadata about object types, e.g., once metadata may be established and/or instances of custom objects may be created. Another set of APIs may be used for processing instance requests relating to specific instances of custom object. Importing may occur over a representational state transfer (REST) endpoint (e.g., REST API) over Internet as described in more detail below in the disclosure. Data may be written into a database (e.g., vastly horizontally distributed database) such that straight bytes may be written into a distributed file system. In some examples, the bytes may be interpreted using metadata in the relational database (e.g., MySQL™ systems). The multi-service business platform 510 may convert the interpreted data to a JSON representation of data (e.g., human readable or machine readable data) to be sent to a user device (e.g., user device(s) 570) or may be available on the platform 510 via a user interface of the user device. The horizontally distributed database may be used primarily as a system of record for storing object values as well as association values. In some examples, the relational database (e.g., mySQL™) may be used for storing property definitions, object definitions, and association definitions. In another example, the horizontally distributed database (e.g., may also be referred to as object instance databases) may include object property values and association instances. The relational databases (e.g., mySQL™ and/or other metadata databases) may include object types, property definitions, and association definitions. The above-described examples of storage for multi-tenant data stores 552 may be some examples of how data may be stored such that other similar and/or different examples of data storage may be utilized while maintaining core functionality of the multi-service business platform 510 and without departing from scope of this disclosure.

In some examples, the multi-service business platform 510 may include security functionality, for example, to avoid exposing entirety of multi-tenant data stores 552 (e.g., platform's object type definition data) to users. Further, in some examples, there may be assumptions about what users may want to do and these assumptions may be internal details. For example, administrators of the multi-service business platform 510 may not want a certain object type exposed to the APIs (e.g., search APIs). In another example, as described in the disclosure, business logic/sensible default service such as sensible defaults may be used by the multi-service business platform 510 in accepting a new custom object (e.g., new custom object type definition) and when creating new associations.

The multi-service business platform may use a process to configure/update data stores (in some examples updating one or more databases in the data stores) based on custom objects. For example, users may use APIs (e.g., the APIs) that may include representational state transfer (REST) APIs that may be exposed via a network (e.g., network 560 such as the Internet). These APIs (e.g., REST APIs) may be used by users (e.g., via the Internet) to specify different operations that may be invoked to establish data needed that may define a new custom object type and/or may define instances of that new custom object type. The REST APIs may include data APIs (e.g., object definition APIs described in the disclosure) that may be used to receive custom object information from user devices 570 and/or integrator devices 576. This process may utilize a wrapper interface such as the object schema service as described in the disclosure. The user may provide information using the object schema service that may include a name of a custom object, properties of a custom object, and associations of the provided custom object type with other custom object types and/or core object types. Users may submit this information via a web request to the APIs. The customization system 520 may execute the business logic/sensible default service (e.g., may use condensed business logic and/or sensible defaults) to interpret the information and insert necessary data in a relational database management system (e.g., set of mySQL™ tables). These mySQL™ tables may be a type of database where metadata may be stored about object types (specifically types of custom objects). Once the metadata may be established, the users may create instances of the custom objects.

In an example where a user affiliated with a drone selling/rental business creates a drone custom object, the user may want to or prefer to import data relating to several drone products and/or instances of drone products (e.g., information related to millions of drones owned by the business and/or instances of activities related to the drones) into the multi-service business platform 510 with different drone IDs and links to different deals that the drones may have been sold or rented under. When this import may be executed, a set of APIs may process these instance requests. For importing several drones (e.g., drone information and/or activities related to drone products), the user may invoke operations over REST APIs (e.g., endpoint over the Internet). The multi-service business platform 510 may take information received and may start writing data into another style of database which may be the vastly horizontally distributed database. The multi-service business platform 510 may be used to add on more virtual machines and continue to store all user data without impacting performance of the overall multi-service business platform 510. This data may be written as straight bytes into what may be essentially a distributed file system. Then, the multi-service business platform 510 may interpret the bytes accurately by using the metadata that may be available in mySQL™ systems (e.g., mySQL™ tables). When the user may want to fetch this data, the multi-service business platform 510 may read all the bytes from the distributed database system. The multi-service business platform 510 may interpret what it means to use the data from the mySQL™ systems. Then, the multi-service business platform 510 may convert this information or data into a human readable or a machine readable JSON representation of the data and may send it back to users. Alternatively, the JSON representation may be available through the existing user interface of the multi-service business platform 510.

In examples, the multi-service business platform 510 may provide a mechanism (e.g., a GUI) for a user to login to the multi-service business platform 510 to start using the created custom objects with the services 530 (e.g., framework features such as workflows, reporting). The multi-service business platform 510 may direct the usage of the integrated custom objects with various functionality. Simply, by creating the custom objects, the user may immediately be able to utilize all the functionality of the multi-service business platform 510 with the created custom objects. For example, the user may use services such as workflow automation 532 (e.g., workflows tool) and the user may see the option to include and/or use the created custom objects with workflows. The multi-service business platform 510 may direct the custom objects to be used with the services 530 providing all the automation of services described in the disclosure (e.g., automatically capable of using services with custom objects created). The custom objects may be account specific such that custom objects may only be used and viewed under one or more user accounts and/or one or more company accounts (e.g., custom object created by owner user of business may only be viewed and used with services by the same owner user). In some examples, the multi-service business platform 510 may be an external/visible entity into which users log in. In other examples, the multi-service business platform 510 may serve as a backbone of higher-level functionality that may be exposed throughout an application user interface (UI) and external APIs of the multi-service business platform 510. For example, as described in the disclosure, a manifestation of this automation integration functionality of the multi-service business platform 510 may be with services 530 (e.g., workflow automation 532 or workflows feature). As described in the disclosure, the multi-service business platform 510 may use the synchronization system 504 for providing custom object synchronization between the customization system 520 and the services 530 of the multi-service business platform 510.

In some embodiments, the multi-service business platform 510 may include the customization system 520 for providing a framework for customized programming. The multi-service business platform 510 may be configured in various ways with the customization system 520 to allow for users to be able to program custom objects. In some embodiments, the customization system 520 may be a tool whereby a user, an internal developer or team of internal developers, and/or a third-party integrator may define code that may run inside the customization system 520 of the multi-service business platform 510. An added benefit of internal developer teams being able to define new custom object types may be the improved speed from development to shipping of these customized objects to users. For example, previously with core objects, release of these objects to users on the multi-service business platform 510 may take several months. Using this new process for creating custom objects on the multi-service business platform 510, the custom objects and related services (e.g., features) may be released to users much sooner and faster such that a user may define a new custom object in minutes and may make use of the custom object immediately. The multi-service business platform 510 may also provide for the execution and/or use of the custom objects that may be programmed with the services 530 and/or other systems of the multi-service business platform 510. For example, custom objects may be defined and the multi-service business platform 510 may be the execution engine that makes use of the custom objects.

The multi-service business platform 510 with the customization system 520 together may form the multi-tenant distributed system (e.g., multi-tenant data stores 552 of the multi-service business platform 510) as described in the disclosure. In some examples, the multi-tenant distributed system and/or multi-tenant data stores as described in the disclosure may be configured generally such that all users' data may reside within a single system. For example, rather than provisioning dedicated systems for each user, the multi-service business platform 510 may be architected to allow for all customer data to co-exist within the same single system. However, the data may be segregated such that the multi-service business platform 510 may prevent mixing of the data (e.g., data from one user is never exposed to another user despite having their data stored in the same system). For example, one data store of the multi-tenant data stores 552 may include all core objects (e.g., CRM objects) and custom objects that may be defined by users, integrator users, and the developers of the multi-service business platform 510. For example, a core object (e.g., contact object), a first custom object (e.g., drone custom object), and a second custom object (e.g., yoga class object) may all coexist within the same multi-service business platform 510 or system. The multi-service business platform 510 may use the services 530 to perform actions and operations on the defined custom objects (e.g., defining workflows, reporting with respect to custom objects, etc.) from the multi-tenant system. In some examples, data of custom objects and instances of custom objects (e.g., drone custom object data and/or instance data of the drone custom object) may be proprietary data even within the multi-tenant data stores 552. This proprietary data within the multi-tenant data stores 552 may be segmented and separated such that the services 530 (and systems of the multi-service business platform 510) may be executed on top of the custom objects and/or instances of objects without any need for these services 530 and systems of the multi-service business platform 510 to access the proprietary data.

For example, when values data of the values data store (and possibly other data of the multi-tenant data stores 552) may be populated from a user and knowledge graphs 556 may be created for the individual users based on this populated data, the services 530 and systems of the multi-service business platform 510 may then operate on the custom objects and instantiations of the custom objects.

In some embodiments, custom objects may be generated to be used in connections with the customer relationship management (CRM) system 502 and the content management system (CMS) 508 that may be based on custom object definitions provided by users. In some examples, the multi-service business platform 510 may provide for custom objects to be linked/connected to and/or used with the CRM system 502 in terms of associations with core objects (e.g., contact objects, company objects, deal objects, and ticket objects) and/or other custom objects. The multi-service business platform 510 may also provide for a relationship between custom objects and the content management system (CMS) 508. Custom objects may be shared between the CRM system 502 and the CMS 508. For example, the CMS 508 may have a database that users may use to define data models to drive pages and content in the CMS 508. Since the building of APIs and systems may be needed for custom objects, the CMS 508 may also migrate its database objects into the customization system 520, storage system 550, and/or other systems of the multi-service business platform 510. Also, when building pages in the CMS 508, users may leverage various tags that pull in data from other parts of the multi-service business platform 510 when a page may be rendered. For example, one such tag may be "crm_object" which may pull in the specified object into the CMS page when it may be rendered. For example, a user that has a "rental property" custom object may use the CMS 508 to define a page that may have a list of all "rental properties" that may be available and ready to rent. The user may then define subpages for when a customer clicks on a specific rental property. The content on the defined subpages may be populated from information stored on those custom objects. Thus, in some embodiments, user defined custom objects may be trackable throughout a user account lifecycle beginning in the CMS 508, through the CRM system 502, and potentially through the multi-client service system 1600. In this way, users may be able to obtain insights from their data that may not have been previously available to them.

In some embodiments, the multi-service business platform 510 may use a common format for integrating custom objects with the multi-service business platform 510. The common format may be embedded in a core of data processing systems. Various applications may be updated automatically, e.g., CRM applications and/or reporting applications may be updated automatically by syncing into third party services 574 (e.g., third party applications). The synchronization system 504 of the multi-service business platform 510 may be used to synchronize custom objects between third party services 574 and the multi-service business platform 510. Custom objects may be configured to synchronize with external objects that exist externally from the multi-service business platform 510 (e.g., external to the CRM system 502/CMS 508). The synchronization system 504 of the multi-service business platform 510 may be used to sync arbitrary custom objects outside the multi-service business platform 510 to objects inside the platform 510, which may facilitate creation of custom objects and workflows (e.g., using workflow automation 532).

In some embodiments, the customization system 520 may provide mechanisms (e.g., GUIs) and processes for creating associations for the custom objects. For example, the customization system 520 may allow for the creation of an association definition entry (e.g., the relationship of identification (ID) representing one object type to an ID representing another object type) in a relational database management system (e.g., mySQL™ tables). The association definition entry may have an ID used to associate instances of two object types with one another. This process may use similar techniques used with graph database processes (e.g., graph database management system processes such as Neo4j processes). Different name associations may be between different object types as well as between same object types.

For example, creating an association may first require a definition of a valid association which may also require a unique ID representing one object type and a unique ID representing another object type that may be the object types associated by this association. When users request that two object types be associated (e.g., where one object may be a custom object), then the customization system 520 of the multi-service business platform 510 may create an association definition entry in a relational database management system (e.g., mySQL™) that may link the custom object type with either another custom object type or a core object as requested. Once the association definition may be created, the association definition may be given an association type ID. The association type ID may be used by users to associate specific instances of two object types with one another. For example, associating two custom objects (e.g., associating two custom object instances may be two rows in a table) may start with a request to associate through an associations API. The customization system 520 of the multi-service business platform 510 may then write a row into the vastly horizontally distributed database (e.g., may also be referred to as an associations database) which may include a "fat row" format (e.g., may have the source object ID as the key and every linked object ID of the same object type belonging to an association type which may extend out in a wide row from that object type). This implementation, for example, may be similar to high end sophisticated graph databases such as a graph database management (e.g., Neo4j) that may use a similar strategy that may be a common proprietary open source graph database.

In some embodiments, a qualifier may be added to an association type that may be a name of the association. The multi-service business platform 510 may have directed named associations and may expand metadata to more sophisticated metadata based on types of associations defined. In examples, company conduct associations may be used such that there may be different types of the associations (e.g., different named associations such that there may be different names of associations between the same object types).

In some embodiments, each respective association may include an inverse or opposite association that may be created automatically in response to defining the respective association. For example, when a user may create an association type (e.g., sold a car between business and customers), the multi-service business platform 510 may automatically create the inverse association type (e.g., "car was sold by") and may give the inverse association the same name as the association. Even though an association may be created such that the user may represent a sale of a car to a customer as the customer "purchased" the car (e.g., when defining the association), the multi-service business platform 510 may also automatically create the inverse association in the opposite direction (e.g., the car was "purchased by" the customer) which may be given the same name but a different association type ID. In summary, when an association may be created for a relationship in one direction, the multi-service business platform 510 may always automatically create an association in the other direction such that the multi-service business platform 510 may support both representations for the association and inverse association which refer to same relationship between objects. For example, using the yoga class example, two custom objects may include class and student. An association between these custom objects may be the class having a student that is Bob. An inverse association (e.g., opposite) of the association may be that student Bob may be an attendee or a member of the class (e.g., yoga class B). In summary, the inverse may mean that an association may be from the opposite view which may be from the view of the student or from the view of the class depending on the original association that was created. In this way, the time to process some search results, listing results, and/or other relevant requests may be reduced via the inverse associations.

In some embodiments, a platform (e.g., a customer platform such as the multi-service business platform 510) is configured to manage and/or track customer service issues using customer-service tickets (also referred to as "tickets"). A ticket may be a data structure that corresponds to a specific issue that needs to be addressed for a contact by or on behalf of the client. Put another way, a ticket may correspond to a service-related process, or any other process or workflow that has a defined start and finish (e.g., resolution). For example, a particular type of ticket used to support an on-line shopping client may be issued when a contact has an issue with a package not being received. A ticket in this example would relate to an issue with the delivery of the contact's package. The ticket may remain unresolved until the contact receives the package, is refunded, or the package is replaced. Until the ticket is resolved, the ticket may remain an open ticket, despite the number of times the contact interacts with the system.

In embodiments, tickets may have attributes. The attributes may include default attributes and/or custom attributes. Default ticket attributes are attributes that are included in any ticket issued by the platform. Custom attributes are attributes that are selected or otherwise defined by a client for inclusion in tickets issued on behalf of the client. A client may define one or more different types of tickets that are used in the client's client-specific service system. Examples of default ticket attributes, according to some implementations of the platform, may include (but are not limited to) one or more of a ticket ID or ticket name attribute (e.g., a unique identifier of the ticket), a ticket priority attribute (e.g., high, low, or medium) that indicates a priority of the ticket, a ticket subject attribute (e.g., what is the ticket concerning), a ticket description (e.g., a plain-text description of the issue to which the ticket pertains) attribute, a pipeline ID attribute that indicates a ticket pipeline to which the ticket is assigned, a pipeline stage attribute that indicates a status of the ticket with respect to the ticket pipeline in which it is being processed, a creation date attribute indicating when the ticket was created, a last update attribute indicating a date and/or time when the ticket was last updated (e.g., the last time an action occurred with respect to the ticket), a ticket owner attribute that indicates the contact that initiated the ticket, and the like. Examples of custom ticket attributes are far ranging, as the client may define the custom ticket attributes, and may include a ticket type attributing indicating a type of the ticket (e.g., service request, refund request, lost items, etc.), a contact sentiment attribute indicating whether a sentiment score of a contact (e.g., whether the contact is happy, neutral, frustrated, angry, and the like), a contact frequency attribute indicating a number of times a contact has been contacted, a media asset attribute indicating media assets (e.g., articles or videos) that have been sent to the contact during the ticket's lifetime, and the like.

In embodiments, the client configuration system is configured to allow a client (e.g., a user affiliated with a client) to configure one or more different types of tickets that are used to record, document, manage, and/or otherwise facilitate individual customer service-related events issued by contacts of the client. For example, a client can customize one or more different types of tickets and, for each different type of ticket, the custom ticket attributes of the ticket. In embodiments, the client configuration system presents a GUI to a user affiliated with the client via the client device 1640 that allows a user to configure ticket objects, which are used to generate instances of tickets that are configured according to the client's specifications. The user may command the client configuration system to create a new ticket object, via the GUI. In doing so, the client may define, for example, the type of ticket, the different available priority levels, a pipeline that handles the ticket, and/or other suitable information. For example, using a menu or a text input box, the user can designate the type of ticket (e.g., "refund request ticket") and the different available priority levels (e.g., low or high). In embodiments, the client configuration system may allow a user to designate a pipeline to which the ticket is assigned. Alternatively, the pipeline may be defined in a manner, such that the ticket management system listens for new tickets and assigns the ticket to various pipelines based on the newly generated ticket and information entered in by the user.

In embodiments, the user may further configure a ticket object by adding, removing, modifying, or otherwise updating the custom attributes of the ticket object. In embodiments, the GUI presented by the client configuration system may allow the user to define new attributes. The GUI may receive an attribute name and the variable type of the attribute (e.g., an integer, a flag, a floating point, a normalized score, a text string, maximum and minimum values, etc.) from the user via the GUI (e.g., using a menu and/or a text input box). In embodiments, the GUI may allow the user to define the manner by which the attribute value is determined. For example, the user may designate that a value of an attribute may be found in a specific field or fields of a specific database record, answers from the client in a live chat or chat bot transcript (e.g., extracted by an NLP system), and the like. The ticket management system may utilize such definitions to populate the attributes of new ticket instances generated from the ticket object. The GUI may allow a user to modify or otherwise edit the attributes of the ticket. For example, a user may rename a ticket type, add or delete attribute types, modify the data types of the different ticket attributes, and the like.

In embodiments, the client configuration system may allow a user to create new and/or update workflows by defining different service-related workflow actions (also referred to as "actions") and conditions that trigger those actions. In some embodiments, a workflow may be defined with respect to a ticket. For example, the user affiliated with a cable or internet service provider (or "ISP") can define an action that notifies a customer when a new ticket is generated (e.g., generates and sends an email to the user that initiated the ticket). In this example, the GUI may be configured to allow the user to define the type or types of information needed to trigger the condition and/or other types of information that may be requested from the customer before triggering the email (e.g., the nature of the problem or reason for calling). The GUI may also allow the user to provide data that may be used to generate the email, such as an email template that is used to generate the email. Continuing this example, the user may define another action that routes the user to a human service specialist and one or more conditions that may trigger the action, such as unresolved issues or client requests. The user can add the action and conditions to the workflow, such that when the condition or conditions are triggered, the customer is routed to a live service specialist.

In embodiments, the ticket management system manages various aspects of a ticket. The ticket management system may generate new tickets, assign tickets to new tickets to respective ticket pipelines, manage pipelines including updating the status of tickets as the ticket moves through the various stages of its lifecycle, managing workflows, and the like. In some embodiments, the ticket management system is implemented as a set of microservices, where each microservice performs a respective function.

In embodiments, the ticket management system is configured to generate a new ticket on behalf of a client-specific service system. In some of these embodiments, the ticket management system may listen for requests to generate a new ticket (e.g., an API call requesting a new ticket). The request may include information needed to generate the new ticket, including a ticket type, a subject, a description, a contact identifier, and/or the like. The request may be received in a number of different manners. For example, a request may be received from a contact request (e.g., a contact fills out a form from the client's website or a website hosted by the platform on behalf of the client), a chat bot (e.g., when a contact raises a specific issue in a chat with the chat bot), via a customer service specialist (e.g., the client calls a service specialist and the service specialist initiates the request), and the like. In response to receiving a ticket request, the ticket management system generates a new ticket from a ticket object corresponding to the ticket type. The ticket management system may include values in the ticket attributes of the ticket based on the request, including the ticket type attribute, the subject attribute, the description attribute, the date/time created attribute (e.g., the current date and/or time), the last update attribute (e.g., the current date and/or time), the owner attribute (e.g., the contact identifier), and the like. Furthermore, in some embodiments, the ticket management system may assign a ticket to a ticket pipeline of the client-specific service system and may update the pipeline attribute to indicate the ticket pipeline to which it was assigned and the status attribute to indicate the status of the ticket (e.g., "new ticket"). In embodiments, the ticket management system may store the new ticket in the proprietary database (e.g., a ticket database).

In embodiments, the ticket management system manages ticket pipelines and triggers workflows defined in the ticket pipelines. In some embodiments, the ticket management system is configured to manage the ticket pipelines and trigger workflows using a multi-threaded approach. In embodiments, the ticket management system 1604 deploys a set of listening threads that listen for tickets having a certain set of attribute values. In these embodiments, each time a ticket is updated in any way (e.g., any time a ticket attribute value is newly defined or altered), each listening thread determines whether the attribute values indicated in the updated ticket are the attribute values that the listening thread is listening for. If the listening thread determines that the attribute values indicated in the updated ticket are the attribute values that the listening thread is listening for, the listening thread may add the ticket to a ticket queue corresponding to the listening thread. For example, a listening thread may listen for tickets having a ticket attribute that indicates that a communication was sent to a contact requesting further information. In response to identifying a ticket having a ticket attribute that indicates that the communication was sent to the contact, the listening thread may add the ticket to the ticket queue. Once in the ticket queue, the ticket management system 1604 may update the ticket status attribute of the ticket, and may trigger one or more workflows defined with respect to the ticket status. For example, a workflow may trigger the client-specific system to schedule a follow up email if no response is received from the contact within a period of time (e.g., three days).

In some embodiments, the ticket management system manages workflows on behalf of a client-specific service system. In some embodiments, the ticket management system is configured to manage workflows using a multi-threaded approach. In embodiments, the ticket management system deploys a set of workflow listening threads that listen for tickets having a certain set of attribute values. In these embodiments, each time a ticket is updated in any way (e.g., any time a ticket attribute value is newly defined or altered), each workflow listening thread determines whether the attribute values indicated in the updated ticket are the attribute values that the workflow listening thread is listening for. If the workflow listening thread determines that the attribute values indicated in the updated ticket are the attribute values that the workflow listening thread is listening for, the listening thread may add the ticket to a ticket queue corresponding to the workflow listening thread. Once a ticket is added to a ticket queue corresponding to the workflow listening thread, the ticket management system may execute the workflow with respect to the ticket. For example, during a conversation with a chat bot, a workflow listening thread may listen for a sentiment attribute value that indicates that the contact is frustrated. When the chat bot (e.g., using NLP) determines that the contact is frustrated (e.g., the sentiment score is below or above a threshold), the chat bot may update the sentiment attribute of a ticket corresponding to the contact to indicate that the contact is frustrated. In response, a workflow listening thread may identify the ticket and add it to its queue. Once in the queue, the workflow may define actions that are to be performed with respect to the ticket. For example, the workflow may define that the ticket is to be routed to a service-specialist. In this example, the contact may be routed to a service-specialist, which may include updating the status of the ticket and providing any relevant ticket data to the service-specialist via a service-specialist portal.

In embodiments, the conversation system 1606 is configured to interact with a human to provide a two-sided conversation. In embodiments, the conversation system 1606 is implemented as a set of microservices that can power a chat bot. The chat bot may be configured to leverage a script that guides a chat bot through a conversation with a contact. As mentioned, the scripts may include a decision tree that includes rules that trigger certain responses based on an understanding of input (e.g., text) received from a user. For example, in response to a contact indicating a troubleshooting step performed by the contact, the script may define a response to output to the contact defining a next step to undertake. In some embodiments, the rules in a script may further trigger workflows. In these embodiments, the chat bot may be configured to update a ticket attribute of a ticket based on a trigged rules. For example, in response to identifying a troubleshooting step performed by the contact, the chat bot may update a ticket corresponding to the contact indicating that the client had unsuccessfully performed the troubleshooting step, which may trigger a workflow to send the contact an article relating to another troubleshooting step from the client's knowledge base.

A ticket database record may include a ticket ID, a client ID, a contact ID, ticket attributes including a status attribute, and other additional ticket data, which may be populated by the techniques described herein based upon message data of messages sent/received over a channel (e.g., a new ticket may be automatically generated based upon a message). The ticket database record stores the types of ticket attributes that may be used to identify, track, and/or manage a ticket issued on behalf of a client. The ticket ID 1742 is a unique value (e.g., string or number) that uniquely identifies a ticket from other tickets. The client ID is a value that indicates the client with respect to which the ticket was issued. As can be appreciated, the client ID may point to the client database record of a particular client. The contact ID indicates the contact that initiated the ticket. As can be appreciated, the contact ID may point to the client database record of the contact that initiated the ticket. The ticket attributes may include or reference any data tied to the ticket. As discussed, the ticket attributes may include default ticket attributes and/or custom ticket attributes. Examples of default ticket attributes may include a ticket priority attribute (e.g., high, low, or medium), a ticket subject attribute (e.g., what is the ticket concerning), a ticket description attribute, a pipeline ID attribute, a creation date attribute, a last update attribute, and the like. The custom ticket attributes may depend on the customizations of the customer. In an example, the custom ticket attributes may include a ticket type attributing indicating a type of the ticket (e.g., service request, refund request, lost items, etc.), a contact sentiment attribute indicating whether a sentiment score of a contact (e.g., whether the contact is happy, neutral, frustrated, angry, and the like), a product ID attribute that indicates a product to which the ticket corresponds, a contact frequency attribute indicating a number of times a contact has been contacted, a media asset attribute indicating media assets (e.g., articles or videos) that have been sent to the contact during the ticket's lifetime, and the like. In embodiments, the ticket attributes may further include the ticket status attribute 1750. The ticket status attribute can indicate a status of the ticket. The status may be defined with respect to the ticket pipeline of the client. For example, example statuses may include: ticket is opened but not acted upon, waiting for customer response, at a chat bot stage, at service specialist, at visit stage, at refund state, issue resolved, and the like. In embodiments, the ticket record may include additional ticket data. In embodiments, the additional ticket data may include or reference the specialist or specialists that have helped service the ticket (e.g., employee IDs), any notes entered by specialists, a number of notes entered by the specialists, a list of materials that have been sent to the contact during attempts to resolve the issue. The additional ticket data may include references to transcripts of conversations with the contact over different mediums. For example, the additional ticket data may include or reference conversations had with a bot, over email, in text message, over social media, and/or with a customer service specialist. The additional ticket data may additionally or alternatively include analytics data. For example, the ticket status attribute may include a sentiment or tone of the contact throughout the timeline, feedback from the contact, a contact score of the client.

The multi-service business platform 510 may include a reporting system that allows users to create different types of visual reports using various data sources associated with a client's business. In some embodiments, the reporting system may allow users to generate visual reports that incorporate data collected with respect to core objects and/or custom objects, thereby providing for multi-dimensional custom reports. The custom event reporting may generate reports using disparate data that was collected, derived, generated, and/or otherwise obtained by the various services of the multi-service business platform 510 such as messages sent or received over a channel.

The multi-service business platform 510 may include an event system (e.g., event system 522). The event system 522 may be configured to monitor for and record the occurrence of events, such as receipt of a message through a channel (e.g., report automation may be implemented/triggered in response to sending or receiving a message over the channel). The event system 522 may be configured to maintain unified events that are tracked across several systems of the multi-service business platform 510. Event records may track all the different types of events that may occur with respect to a particular type of object such that the event record provides a log of all instances of different types of events that occurred with respect to the object. The event system 522 may fit with several of the services in this disclosure including reporting aspects and triggering of workflows and actions as related to default and custom objects.

The multi-service business platform 510 may include instances of custom objects that may be used to perform customer-defined analytics (e.g., analytics 538) across the CRM system 502 and the CMS 508. The multi-service business platform 510 may include a common infrastructure such that all objects (new, old, core, and custom objects) may be tracked via a unified analytics pipeline. The custom analytics may be associated with CRM/CMS based on custom object definitions that may be provided by users. The custom analytics may be used with a unified analytics pipeline such that all event reporting may be based on that pipeline (e.g., utilizing common infrastructure). The multi-service business platform 510 may generate custom actions that may operate on or with respect to instances of the custom objects. The custom actions may be part of another system that may reside within the multi-service business platform 510. The multi-service business platform 510 may be built on top of the customization system 520 (e.g., custom object data system) and may not be aware of workflows or their custom actions. The custom actions may be based on objects being considered nouns and actions being considered verbs such that automation of the multi-service business platform 510 may allow for verbs as actions may be added easily along with adding nouns as custom objects. The multi-service business platform 510 may include APIs such that any user may write their own extensions (e.g., using Lambdas or serverless functions). For example, custom actions may be new types of actions that may be implemented due to creation of new custom objects (e.g., new actions tracked based on new custom objects).

The multi-service business platform 510 may include custom objects that may be configured to support a custom application architecture of a user that may connect with the CRM system 502/CMS 508 of the multi-service business platform 510. The multi-service business platform 510 may be an arbitrary platform that may act on arbitrary objects to do arbitrary actions and sync to arbitrary systems and may get the benefit of various capabilities. In an example, the CMS 508 may be made front end to the CRM system 502 (e.g., under protection of login) such that a user may view what they need in the CMS 508. The custom application may be any type of application, e.g., a web application. For example, a yoga studio business may include custom objects such as schedule objects, class objects, "my calendar" (gigantic web application) that may be built on top of the CMS 508 and the CRM system 502 such that users may build and present CMS-driven apps integrated with the multi-service business platform 510.

The multi-service business platform 510 may support a custom application architecture of a user that may integrate with a payment processing service (e.g., payment system 524) and may connect with the CRM system 502/CMS 508 such that a payment processing service may feed payment data to the CRM system 502 and the CMS 508 of the multi-service business platform 510 in real-time. In some embodiments, the payment system 524 is configured to establish payment sessions for customers with third-party payment processors on behalf of clients of the multi-service business platform 510. The payment processing service may, for example, assist a manufacturing company in creating invoices for its customers and may initiate payment sessions with a third-party payment processor that allows the customers to pay the amounts indicated in the invoices directly via the third-party payment processor. In this way, the multi-service business platform 510 may not have to request, receive, or securely store sensitive payment information from the client's customers, while still being involved in the payments' workflows. Using this payment processing service, customers may easily go onto a website and make a purchase similar to other purchasing sites. The payment processing service may be used with business to business (B2B) transactions, e.g., custom objects for B2B; custom actions for B2B; and tight integration between objects in a B-commerce framework (e.g., product catalog may be in the CRM, the website may be in the CMS, payments may be immediately reflected in the CRM and deal records, custom objects may be shipping and/or tracking, etc.).

The multi-service business platform 510 may include an attribution reporting tool which may be an extremely powerful tool that may leverage much of this disclosure. Attribution reporting may be a measure of efficacy of effort. For example, a user's business may have website visitors that may be reviewing web pages, may be filling out forms, etc. and the user's business may have sales reps making calls. All these actions by visitors and by members of the business may be measured by how effective each of these individual touch points was in order to have some outcomes (e.g., closing deal). Attribution reporting may take all these different inputs which may be happening in the multi-service business platform 510 (e.g., the CRM system 502 of the multi-service business platform 510) and may weight them using different models. The weighting may be prescriptive or customizable. When prescriptive, weighting may be based on some industry standard attribution models that may be built (e.g., W model or a U model or an "all touch" model may be used). These standard attribution models may focus on what may be the weighting percentages that may be attributed to specific touch points which may be the first interaction some customers have with the business or it may be the way that customers became a contact in CRM (e.g., these may be important touch points that users may want to add or increase weight for). In another example, weighting may use a machine learning (ML) powered model which may take in various actions that may be happening and may try to determine what may actually be the most likely property along the same customer journey (e.g., may use ML model that may be indicative of user's business process). Then, the attribution reporting may report on which may be the most valuable touch points along a customer's journey through the process till outcome (e.g., closing a deal). Custom objects may fit in with attribution reporting such that custom objects may be the output of this attribution system. The multi-service business platform 510 may include an attribution engine for providing these functionalities. The attribution engine may be able to leverage custom objects as the output, which may mean all services and/or systems described in the disclosure may also be utilized. For example, this attribution reporting may be used alongside other services such as custom object reporting. There may be workflows that may be triggered based on the attribution engine which may be a result of the fact that custom objects are the way that various data may be processed on the multi-service business platform 510.

In some embodiments, the multi-service business platform 510 may include an event system 522 that may be configured to monitor for and record the occurrence of events, such as a message being sent or received over a channel. In some embodiments, the multi-service business platform 510 may include an events system 522 that is configured to monitor for and record an occurrence of events. Events may include various types of events that relate to different facets of a client's business. In some embodiments, events may include a standard set of events that are tied to the CRM system 502, the CMS 508, the multi-client service system 1600, a payment system 524, and/or the like. For example, with respect to the CRM system 502, example events may include instances of potential customers (which may be also referred to as "contacts") visiting a client's website, a potential customer being contacted by a salesperson, a potential customer contacting the client, an offer being made to the potential customer, a deal being closed with the potential customer, an offer being rejected by the potential customer, a form being submitted by a contact, and the like. With respect to the CMS 508, examples of events may include an electronic message being sent to a contact, a contact opening an electronic message, a contact clicking on a link in an electronic message, a contact responding to an electronic message, a contact sharing a link contained in an electronic message, and the like. Examples of service-related events may include an initiation of a new ticket by a customer, a customer service representative contacting the customer, an action being taken with respect to the ticket, an issue corresponding to the ticket being resolved, a ticket being closed, feedback.

In some embodiments, events may be recorded in event records that may be stored in an event data store(s) 558 (e.g., may include an events database) within a storage system 550. In some embodiments, an event record may provide a log of one or more types of events that may be recorded in relation to respective instances of a particular type of object. For example, a "contact" event record may be one type of event record. The "contact" event record may track events with respect to a contact such that the contact event record may track instances of the contact receiving an email, the contact responding to an email, the contact viewing the client's website, the contact submitting a form to the client, the contact purchasing a product, the contact initiating a ticket with respect to a purchase made by the contact, the contact requesting a refund, the contact being issued a refund, the contact leaving a review, the contact closing a ticket, and/or the like. In some embodiments, the event record may store or reference each instance of each type of event. Thus, if a contact is sent multiple emails, a corresponding instance of a contact event record may identify each time the contact was sent an email from the client (e.g., from a salesperson or an automated message). Furthermore, in some embodiments, an event record may store properties for each type of event that may be tracked. In some embodiments, the properties of an event record may include a timestamp (e.g., date and/or time), an event identifier, one or more associations to different objects, and any other suitable properties (e.g., default properties or customer defined properties that may be tracked throughout the platform). Continuing the "contact" event record example, the properties of each instance of an email sent to the client may include a timestamp indicating when the email was sent and an association that indicates from whom the email was sent. Similarly, the contact event record may track each of the contact's purchase events, whereby each purchase made by the contact may be recorded in the contact event record with a time stamp and an association to an instance of the product and/or service that was purchased by the contact.

An event record may include a reference to a primary object. The reference to the primary object may indicate the object (e.g., core object or custom object) to which the events being tracked in the event record correspond. For instance, the primary object may be a contact object, a company object, a ticket object, a deal object, a product object, a service object, a custom object defined by a client, and/or the like. Thus, when a new instance of an event record is created in relation to an instance of an objection (e.g., contact, ticket, deal, company), the created event record instance may be associated with a respective object instance corresponding to the instance of the primary object (e.g., contact, ticket, deal, company, or the like). In this way, events relating to the instance of the core object, the custom object, or the like may be tracked in the newly created event record instance, such as in response to receiving or sending a message over a channel.

In some embodiments, the event system 522 may be configured to monitor for and log events that may occur in relation to a set of objects (e.g., core objects and/or custom objects) defined by the user, such as receiving or sending a message over a channel. As discussed, a user may define a custom object (or multiple custom objects) and may define the events that occur with respect to the custom object and other objects (custom objects, core objects, and/or standard objects) that may be related to the client's business via the customization system 520. In defining the custom objects, the user may also define the properties of the custom objects and sources for the types of data represented by the properties. In some embodiments, event instances corresponding to the custom object may be detected and recorded when data is received from a specific source. In some of these some embodiments, the event system 522 may instantiate and execute listening threads that may listen to various services of the multi-service business platform 510 (e.g., payment services, ticketing services, CRM services, CMS services, machine-learning services, geolocation services, identity resolution services, telemetry services, and/or the like) and/or external event sources for particular types of data and may update the event data store(s) 558 and/or the knowledge graph 640 based on the data obtained from the various services. Other services 6132 may include services 530 of the multi-service business platform 510, other services within the multi-service business platform 510, and/or other services that may be external from the platform 510.

In some embodiments, the event system 522 may expose (e.g., provide access to an API of) an event reporting service that may execute listening threads on behalf of one or more clients. An event reporting service may monitor a set of data streams (e.g., receiving or sending a message over a channel) to identify events that may be recorded in the event data store(s) 558. In some embodiments, the event reporting service may be configured to execute a set of listening threads on behalf of a client. In some embodiments, a listening thread may monitor one or more data streams for one or more specific types of data that may be generated or otherwise provided by other services of the multi-service business platform 510 and/or external event sources. In these some embodiments, the listening thread may analyze the data streams and may extract specific information that may indicate the occurrence of an instance of a specific type of event and one or more properties of an event instance. In some embodiments, the listening thread may report the event and the event properties thereof to the event reporting service, which in turn may update the event data store(s) 558 based on the recorded event instance. In some embodiments, the event reporting service may determine the types of objects that may be associated with the particular event instance (e.g., based on the event type of the particular event) and may identify the particular object instances that may be associated with the particular event instance based on the event properties of the event instance. In these some embodiments, the event reporting service may associate the event instance with respect to event record instances that may be associated with the particular object instances. Further examples of an event reporting service are described with respect to the reporting system discussed in the disclosure. The event reporting service may be used in connection with other services of the platform 510. For example, the event reporting service may trigger workflows performed by a workflow service and/or other actions that may be performed by other systems of the multi-service business platform 510.

The multi-service business platform 510 includes a reporting system 526 that allows users to create different types of reports (e.g., custom reports) using various data sources associated with a client's business, including data sources corresponding to custom objects defined with respect to the client's business and/or any default objects that may be maintained with respect to the client's business, and using message data of messaged received or sent over a channel. One benefit of custom reporting may be that users are provided greater leeway in framing an inquiry of a report, which may allow for a much wider range of data to be used to generate reports. For instance, a user may wish to view a report that depicts how many customers that have made multiple purchases with the client have submitted customer service tickets. Furthermore, the user may break down the results of the report by the type of ticket (e.g., delayed shipping, malfunctioning product, missing parts, or the like). In some embodiments, the reporting system 526 may leverage a schema layer that may operate on a client's respective ontology to determine data types of object(s) and event properties and associations between the client's objects and/or events to support the generation of custom reports in a flexible and schema-agnostic manner. As mentioned, a custom report may include a visualization (or "chart") that may be generated by the reporting system 526 based on message data of messages received or sent over a channel. Examples of the visualization may include, but may not be limited to, a graph, a histogram, a pie chart, and/or the like.

In some embodiments, the reporting system 526 may present a data set selection GUI to a user that allows the user to select one or more data sources, such as message data of messages sent or received over a channel. In some embodiments, an event reporting service may monitor for and record events in the event data store(s) 558, such as message data of messages received or sent over a channel. In some embodiments, the event reporting service may be configured to execute a set of listening threads on behalf of a client. In some embodiments, a listening thread may listen for one or more specific types of data that may be generated or otherwise provided by other services of the multi-business platform and/or external systems. For example, a listening thread that may be configured with respect to a yoga studio may listen for payments that are processed on behalf of the yoga studio (e.g., an email confirmation of payment received over a channel). Each time a payment is processed on behalf of the yoga studio, a payment service (e.g., as exposed by the payment system 524) may issue a payment notification of the payment to the event reporting service.

A workflow system 562 may include a custom workflow actions system 564 that may communicate with various systems, devices, and data sources. The workflow system 562 may perform workflow automation based upon messages sent and/or received over a channel. The custom workflow actions system 564 may provide users with the ability to create custom workflow actions (e.g., custom code actions). In general, the custom workflow actions system 564 may relate to a custom workflow action process for setting up a custom workflow action.

In some embodiments, the custom workflow actions system 564 may allow users to define custom actions. For example, a custom action definition may include all information needed for workflows (e.g., needed for workflow system 562) to display the custom action in a workflows application. This same definition may also specify the request format for requests coming from other services, systems, data sources, etc. in the platform 510 as well as the handling of responses from these other services, systems, data sources, and the like. In some embodiments, the custom action definition may include: an action name (e.g., label given to the action in the workflows application) and action inputs (e.g., fields that may be filled out by a user to control the action's behavior and/or the selected values that may be included in the request that may be sent to the action web address such as "actionUrl"). The custom action definition may also include input options (e.g., define a set of valid values for the action inputs). In some examples, the input options may be optional for each field. In other examples, the input options may be either a static list or a webhook URL that may be provided. If the webhook URL is provided, the options may be fetched from that URL whenever the action may be edited by a user in the workflow actions system (e.g., workflows tool). In some embodiments, the custom action definition may also include an action web address (e.g., action URL "actionUrl") and labels. An HTTPS request may be sent to the action URL whenever the action may be executed by the workflow system 562 (e.g., workflows tool). The request body may include information about which user the action is executing on behalf of, and what values may be entered for the input fields. The labels may be a user-facing copy that describes to the user what the action's fields may represent and what the action does. Labels may be specified in any number of languages (e.g., English, French, German, Spanish, etc.).

In some embodiments, the custom workflow actions system 564 may provide for a variety of other processes with respect to the defined custom actions. Validating requests may be made for the custom actions. In some examples, there may be default payloads (e.g., field option fetch) such that requests to fetch options may be made when a user may be configuring a custom action in a workflow. In some examples, if there is a desire to limit the number of options that may be returned by an option fetch, a pagination cursor may be set which may instruct the workflow system 562 (e.g., workflows tool) that more options may be loaded. The list of options may be made searchable allowing for results to be filtered by a search query (e.g., return "searchable": true). In an example embodiment, execution requests may be made when a workflow may be executing a custom action against an enrolled object. For example, there may be input fields for workflows (e.g., contact and deal workflows) such that there may be a static input field (e.g., dropdown field with options) where one field may have a value for a platform user and another field may have a value pull from a property (e.g., as selected by a user for workflows) on the enrolled object.

In some embodiments, there may be a variety of use cases for the workflow actions system 564. Some example use cases may include: transforming data (e.g., turning a string into a date/time object such as "date_time" or changing a formatting of a phone number), data hygiene (e.g., name capitalization, name concatenation, etc.), lead assignment, territory management, service-level agreement (SLA) management for service issues, customizing webhook payloads (e.g., change format of a request that may get made for a webhook action, and with the custom code action (and the requests library)), and/or the like. In some embodiments, random number generator functions may be used (e.g., cryptographically secure pseudo-random number generation) such as with respect to enrolling objects into a workflow.

In some embodiments, a new workflow or opening a previously created workflow associated with one or more events is performed. A workflow actions process may be initiated providing a list of multiple actions (e.g., action types) to select from with respect to the new workflow or the previously created workflow. A custom code action may be selected from the list of multiple actions creating a new custom code action. Next, a custom instruction code for a customized action associated with the newly created custom code action may be received from a user (e.g., a user may use a code editor which may relate to one or more actions in the workflow). The new workflow or previously created workflow may be executed based on the occurrence of the one or more events at 7510. Then, the new custom code action may be triggered as part of the execution of the new workflow or previously created workflow. Running and executing the custom instruction code of the new custom code action may result in actions corresponding with written instructions (e.g., steps) in the custom instruction code.

In general, the custom workflow actions system 564 (e.g., custom code workflow actions tool) may allow users to create workflows that respond to events so that the users may customize any action that they want after an event has taken place. The custom workflow actions system 564 may function within a custom workflow actions process. Other related actions and/or functions may also be included in the custom workflow actions process. In some embodiments, events may be defined generally as some change in the platform (e.g., multi-service business platform 510). For example, this change may be a property change on a contact or anything that may drive a list change. Then, the multi-service business platform 510 may take an action on any number of user-configured actions. For example, the multi-service business platform 510 may be used to configure or set properties, send emails, send notifications, call other URLs in other companies. In some embodiments, other actions may be taken within the scope of this disclosure providing a relatively broad list of actions that may be taken. Some examples of events of extensions may include create a ticket (e.g., an issue tracking ticket such as a Jira ticket), or create an Asana ticket, or call out a webhook to a third-party company or internally, etc. In other examples, messages may be sent through various channels (e.g., send Slack messages).

Using the custom code action may allow for various other use case examples (and related processes) that may be performed with objects. For example, the system may run different processes on objects, calculate different fields within that data, etc. Further, the custom workflow actions process (e.g., using the custom workflow actions system 564) may execute API calls out to other systems or into the internal API to get other data.

Example available data to workflows may be expanded. In one example, it may be expanded to include data passing, such as the passing of message data of messages sent or received over a channel. This may mean that any action that happens may also take the custom code action. In some embodiments, there may be a state that may be passed into one of these functions called an event. This may describe a variety of fields that are available to the workflow (e.g., in the platform). What comes in the event may be an origin or portal, some information about the action, the object that was enrolled (e.g., that may be looked), and a callback ID for this execution if logging it or the like is preferred. In some embodiments, there may be a passing in of what objects are enrolled and/or what objects (e.g., contact objects) may be started in workflows which may be directed to the code of the custom workflow actions system 564 that the platform 510 may need for some next actions.

In general, each custom code action may be an action within a larger workflow. The custom code action may fit into a broader category of actions. An example "send email" interface (e.g., using custom workflow actions system 564) which may be built into workflows (e.g., may have a UI that may be already built-in). This "send email" action may allow for a selection of emails to be sent such that when this action executes, contacts may be sent a particularly selected email. There may be other prepackaged actions that provide external communication by sending an email or sending a notification (e.g., Slack notification), provide assignment (e.g., rotate a record to the owner), provide creation (e.g., create a record or create a task), provide list management (e.g., add to a static list or remove from a static list), provide ads/advertisement management (e.g., add to an ads audience, remove from an ads audience, or the like), provide delay (e.g., delay for a set amount of time, delay until a day or a selected time, delay until an event happens, or the like), provide internal communication (e.g., send internal email notification, send internal marketing email, send internal short message service (SMS), send in-app notification, or the like), etc.

Figure 11:
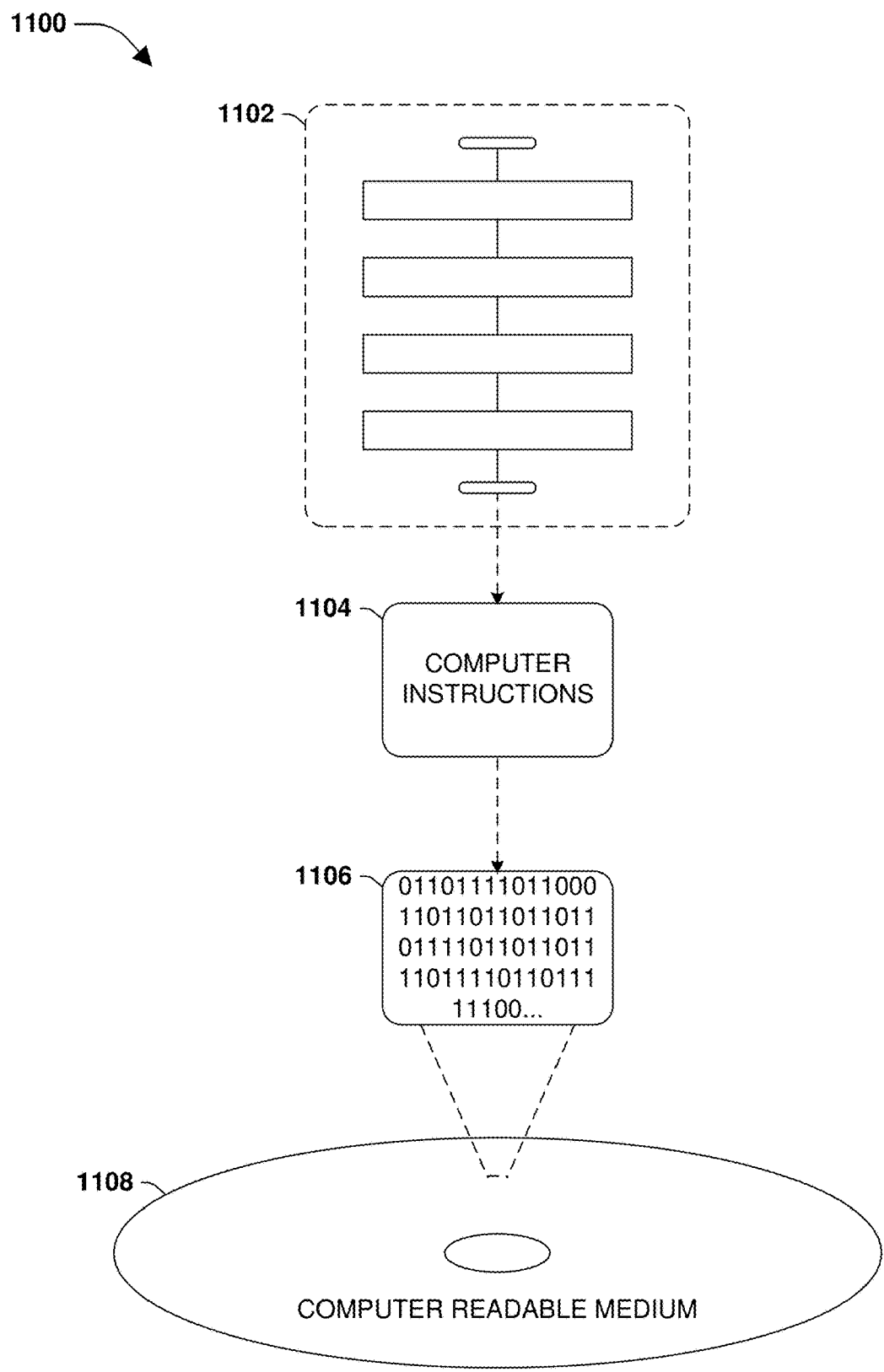
FIG. 11 is an example of a computer readable medium in which an embodiment of the present technology may be implemented.

A computer-readable medium comprises processor-executable instructions configured to implement one or more of the techniques presented herein. An example embodiment of a computer-readable medium or a computer-readable device is illustrated in FIG. 11, wherein the implementation 1100 comprises a computer-readable medium 1108, such as a CD-R, DVD-R, flash drive, a platter of a hard disk drive, etc., on which is encoded computer-readable data 1106. This computer-readable data 1106, such as binary data comprising at least one of a zero or a one, in turn comprises a set of computer instructions 1104 configured to operate according to one or more of the principles set forth herein. In some embodiments, the processor-executable computer instructions 1104 are configured to perform a method 1102, for example. In some embodiments, the processor-executable instructions 1104 are configured to implement a system, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims. As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. A component may reside within a process and/or thread of execution and a component may be localized on one computer and/or distributed between two or more computers. Furthermore, the claimed subject matter may be implemented as a method, apparatus, or article of manufacture using programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Many modifications may be made to this configuration without departing from the scope or spirit of the claimed subject matter.

Figure 12:
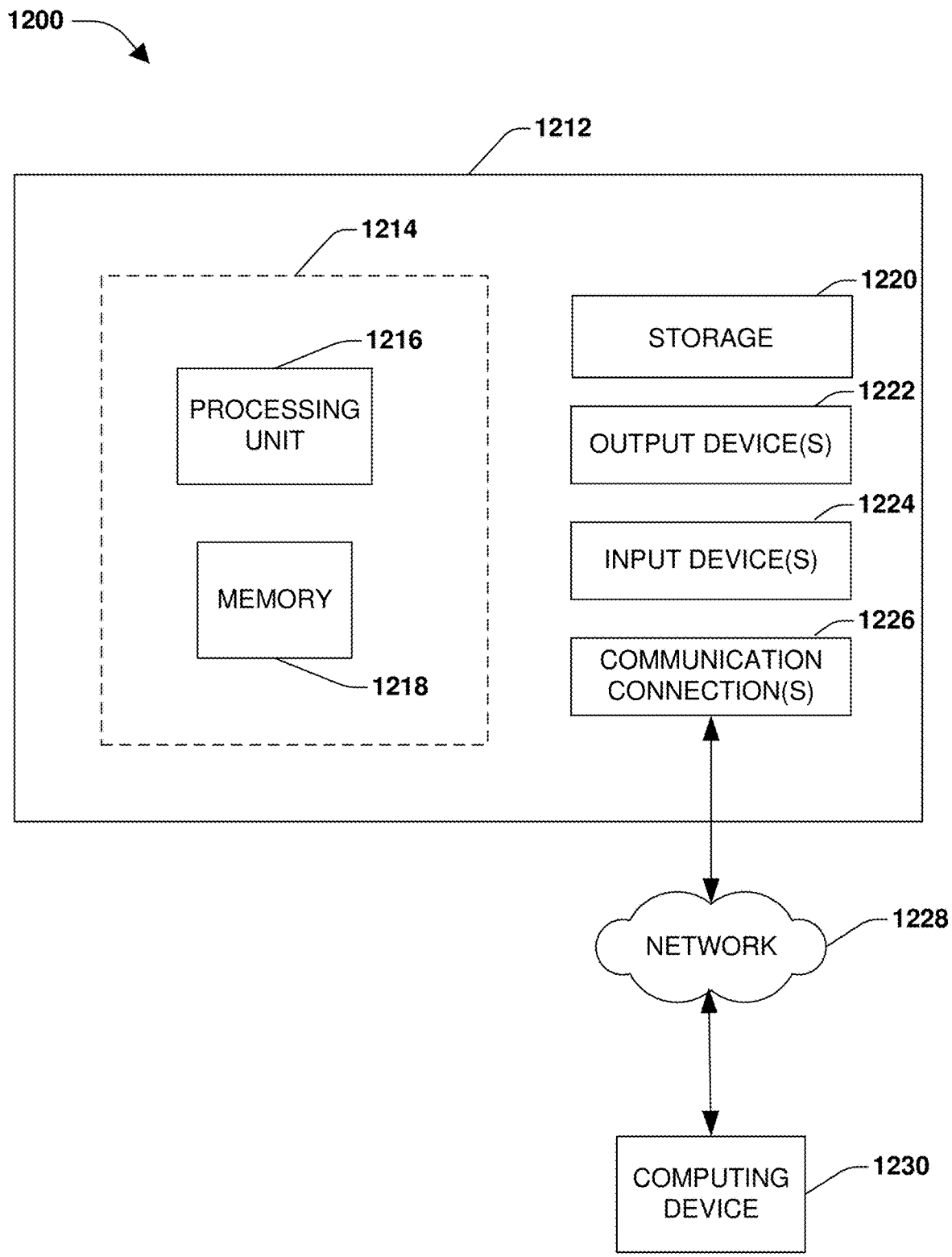
FIG. 12 illustrates an exemplary computing environment wherein one or more of the provisions set forth herein may be implemented.

FIG. 12 and the following discussion provide a brief, general description of a suitable computing environment to implement embodiments of one or more of the provisions set forth herein. The operating environment of FIG. 12 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like. Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 12 illustrates an example of a system 1200 comprising a computing device 1212 configured to implement one or more embodiments provided herein. In one configuration, computing device 1212 includes at least one processing unit 1216 and memory 1218. Depending on the exact configuration and type of computing device, memory 1218 may be volatile (such as RAM, for example), non-volatile (such as ROM, flash memory, etc., for example) or some combination of the two. This configuration is illustrated in FIG. 12 by dashed line 1214. In other embodiments, device 1212 may include additional features and/or functionality. For example, device 1212 may also include additional storage (e.g., removable and/or non-removable) including, but not limited to, magnetic storage, optical storage, and the like. Such additional storage is illustrated in FIG. 12 by storage 1220. In one embodiment, computer readable instructions to implement one or more embodiments provided herein may be in storage 1220. Storage 1220 may also store other computer readable instructions to implement an operating system, an application program, and the like. Computer readable instructions may be loaded in memory 1218 for execution by processing unit 1216, for example. The term "computer readable media" as used herein includes computer storage media. Computer storage media includes volatile and nonvolatile, removable and non-removable media implemented in any method or technology for storage of information such as computer readable instructions or other data. Memory 1218 and storage 1220 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1212. Computer storage media does not, however, include propagated signals. Rather, computer storage media excludes propagated signals. Any such computer storage media may be part of device 1212.

Device 1212 may also include communication connection(s) 1226 that allows device 1212 to communicate with other devices. Communication connection(s) 1226 may include, but is not limited to, a modem, a Network Interface Card (NIC), an integrated network interface, a radio frequency transmitter/receiver, an infrared port, a USB connection, or other interfaces for connecting computing device 1212 to other computing devices. Communication connection(s) 1226 may include a wired connection or a wireless connection. Communication connection(s) 1226 may transmit and/or receive communication media. The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal. Device 1212 may include input device(s) 1224 such as keyboard, mouse, pen, voice input device, touch input device, infrared cameras, video input devices, and/or any other input device. Output device(s) 1222 such as one or more displays, speakers, printers, and/or any other output device may also be included in device 1212. Input device(s) 1224 and output device(s) 1222 may be connected to device 1212 via a wired connection, wireless connection, etc. In one embodiment, an input device or an output device from another computing device may be used as input device(s) 1224 or output device(s) 1222 for computing device 1212. Components of computing device 1212 may be connected by various interconnects, such as a bus. Components of computing device 1212 may be interconnected by a network. For example, memory 1218 may be comprised of multiple physical memory units located in different physical locations interconnected by a network. For example, a computing device 1230 accessible via a network 1228 may store computer readable instructions to implement one or more embodiments provided herein.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments. Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object. Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", and/or variants thereof are used in either the detailed description or the claims, such terms are intended to be inclusive in a manner similar to the term "comprising". Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
   utilizing an application programming interface to create a channel connected to a service of a customer platform, wherein the channel is defined to specify how the channel is to interact with the service;

integrating a channel framework with the customer platform, wherein the channel framework is defined with levels including a first level for building and connecting to channels, a second level for constructing functions of channels in a workspace, and a third level for enabling workspace features within the channel framework;

defining the channel framework to include at least one of a fourth level for integrating the channel framework into a customer relationship management (CRM) system or a fifth level for enabling platform tools within the channel framework;

defining first flows for sending and receiving messages across the channel according to messaging functionality supported by the service;

defining second flows for viewing and interacting with the messages based upon context for viewing and interacting with the messages through the service; and executing, utilizing the levels of the channel framework, the first flows and the second flows for processing the messages.

2. The method of claim 1, wherein the utilizing comprises:
utilizing a channel integration application programming interface to define and set a channel configuration for the channel.

3. The method of claim 1, comprising:
utilizing a user experience framework to discover and connect the channel to the service.

4. The method of claim 1, comprising:
utilizing a data framework to capture and store user accounts for the channel, wherein a user account defines a channel type, user account specific rules, and user account specific settings.

5. The method of claim 1, comprising:
in response to receiving a selection of a user account for the channel, syncing and sending messages through a team workspace of a team workspace service during channel connection of the channel.

6. The method of claim 1, comprising:
integrating the channel with workflows associated with a ticket automation service.

7. The method of claim 1, comprising:
utilizing a data framework to facilitate message composition and channel and recipient searching.

8. The method of claim 1, comprising:
enabling user to move from utilizing the channel in a context to utilizing a different channel in the context.

9. The method of claim 1, comprising:
utilizing a customer relationship management service of the customer platform for conversational automation and reporting associated with messages using the channel.

10. The method of claim 1, comprising:
capturing data points from the channel for storage into a customer relationship management (CRM) system, wherein the data points are evaluated to identify information about the message and recipient of the message.

11. A non-transitory machine-readable storage medium comprising instructions that when executed by a machine, causes the machine to perform operations comprising:
utilizing an application programming interface to create a channel connected to a service of a customer platform, wherein the channel is defined to specify how the channel is to interact with the service;
integrating a channel framework with the customer platform, wherein the channel framework is defined with levels including a first level for building and connecting to channels, a second level for constructing functions of channels in a workspace, and a third level for enabling workspace features within the channel framework;
defining the channel framework to include at least one of a fourth level for integrating the channel framework into a customer relationship management (CRM) system or a fifth level for enabling platform tools within the channel framework;
defining first flows for sending and receiving messages across the channel according to messaging functionality supported by the service;
defining second flows for viewing and interacting with the messages based upon context for viewing and interacting with the messages through the service; and
executing, utilizing the levels of the channel framework, the first flows and the second flows for processing the messages.

12. The non-transitory machine-readable storage medium of claim 11, wherein the customer platform supports a team workspace service, a customer relationship management service, a workflow service, and a reporting service.

13. The non-transitory machine-readable storage medium of claim 11, wherein the utilizing comprises:
utilizing a channel integration application programming interface to define and set a channel configuration for the channel.

14. The non-transitory machine-readable storage medium of claim 11, comprising:
utilizing a data framework to capture and store user accounts for the channel, wherein a user account defines a channel type, user account specific rules, and user account specific settings.

15. The non-transitory machine-readable storage medium of claim 11, comprising:
in response to receiving a selection of a user account for the channel, syncing and sending messages through a team workspace of a team workspace service during channel connection of the channel.

16. A computing device comprising:
a memory comprising machine executable code; and
a processor coupled to the memory, the processor configured to execute the machine executable code to cause the processor to perform operation comprising:
utilizing an application programming interface to create a channel connected to a service of a customer platform, wherein the channel is defined to specify how the channel is to interact with the service;
integrating a channel framework with the customer platform, wherein the channel framework is defined with levels including a first level for building and connecting to channels, a second level for constructing functions of channels in a workspace, and a third level for enabling workspace features within the channel framework;
defining the channel framework to include at least one of a fourth level for integrating the channel framework into a customer relationship management (CRM) system or a fifth level for enabling platform tools within the channel framework;
defining first flows for sending and receiving messages across the channel according to messaging functionality supported by the service;
defining second flows for viewing and interacting with the messages based upon context for viewing and interacting with the messages through the service; and executing, utilizing the of levels of the channel framework, the first flows and the second flows for processing the messages.

17. The computing device of claim 16, wherein the operations comprise:
integrating the channel with workflows associated with notifications, routing automation, and ticket automation.

18. The computing device of claim 16, wherein the operations comprise:
utilizing a data framework to facilitate message composition comprising text formatting, media handling, attachment handling, recipient search, and channel searching.

19. The computing device of claim 16, wherein the operations comprise:
enabling a user to move from utilizing the channel in a context to utilizing a different channel in the context.

* * * * *